United States Patent [19]
Koyanagi et al.

[11] Patent Number: 5,557,332
[45] Date of Patent: Sep. 17, 1996

[54] APPARATUS AND METHOD FOR REPRODUCING A PREDICTION-ENCODED VIDEO SIGNAL

[75] Inventors: Hideki Koyanagi; Hiroshi Sumihiro, both of Kanagawa; Seiichi Emoto, Tokyo; Tohru Wada, Kanagawa, all of Japan

[73] Assignee: Sony Corporation, Tokyo, Japan

[21] Appl. No.: 437,016

[22] Filed: May 8, 1995

Related U.S. Application Data

[63] Continuation of Ser. No. 205,092, Mar. 2, 1994, abandoned.

[30] Foreign Application Priority Data

Mar. 5, 1993 [JP] Japan ................................ 5-045112

[51] Int. Cl.⁶ .................................................. H04N 7/12
[52] U.S. Cl. .......................... 398/416; 348/402; 348/409; 348/411; 348/699; 348/700; 348/715; 348/717
[58] Field of Search ..................... 348/715, 716, 348/721, 416, 411, 419, 412, 402, 717; 382/56; 395/166, 165

[56] References Cited

U.S. PATENT DOCUMENTS

| | | | |
|---|---|---|---|
| 4,942,470 | 7/1990 | Nishitani et al. | 348/416 |
| 5,103,307 | 4/1992 | Sugiyama | 348/416 |
| 5,130,797 | 7/1992 | Murakami | 348/416 |
| 5,138,447 | 8/1992 | Shen et al. | 348/416 |
| 5,142,360 | 8/1992 | Nihara | 348/409 |
| 5,159,447 | 10/1992 | Haskell et al. | 348/419 |
| 5,170,259 | 12/1992 | Niihara | 348/419 |
| 5,204,740 | 4/1993 | Ishii | 348/402 |
| 5,243,419 | 9/1993 | Faryar et al. | 348/409 |
| 5,247,355 | 9/1993 | Frederiksen | 348/409 |
| 5,249,047 | 9/1993 | Aoki et al. | 348/416 |
| 5,251,030 | 10/1993 | Tanaka | 348/402 |
| 5,267,334 | 11/1993 | Normille et al. | 348/416 |
| 5,274,717 | 12/1993 | Miura et al. | 348/416 |
| 5,287,193 | 2/1994 | Lin | 348/409 |
| 5,289,577 | 2/1994 | Gonzales | 348/416 |

*Primary Examiner*—Tommy P. Chin
*Attorney, Agent, or Firm*—William S. Frommer; Alvin Sinderbrand

[57] ABSTRACT

A digital video signal that has been encoded using motion-compensated prediction, transform encoding, and variable-length coding, is decoded using parallel processing. Frames of the video signal are divided into slices made up of a sequence of macroblocks. The signal to be decoded is slice-wise divided for parallel variable-length decoding. Each variable-length-decoded macroblock is divided into its constituent blocks for parallel inverse transform processing. Resulting blocks of difference data are added in parallel to corresponding blocks of reference data. The blocks of reference data corresponding to each macroblock are read out in parallel from reference data memories on the basis of a motion vector associated with the macroblock. Reference data corresponding to each macroblock is distributed for storage among a number of reference data memories.

25 Claims, 16 Drawing Sheets

APPARATUS AND METHOD FOR REPRODUCING A PREDICTION-ENCODED VIDEO SIGNAL

This application is a continuation of application Ser. No. 08/205,092, filed Mar. 2, 1994 now abandoned.

BACKGROUND OF THE INVENTION

1. Field of the Invention

This invention relates to decoding of prediction-coded video signals, and more particularly is directed to the application of parallel processing to such decoding.

2. Description of Related Art

It is well known to perform compression coding on video data which represents a moving picture in order to reduce the quantity of data to be recorded and/or transmitted. Such data compression may be useful, for example, in recording/reproducing systems using recording media such as magnetic tape or optical disks, and is also useful in transmission systems such as those used for video teleconferencing, video telephone, television broadcasting (including direct satellite broadcast), and the like. For example, it has been proposed by the Moving Picture Experts Group (MPEG) to compression-code moving picture video data utilizing motion-compensated prediction, transform processing using an orthogonal transformation such as the discrete cosine transform (DCT), and variable-length coding. A system for decoding and reproducing such compression-coded video data is illustrated in block diagram form in FIG. 14.

As shown in FIG. 14, a sequence of compression-coded video data is provided at an input terminal 101 for processing, in turn, by an inverse VLC (variable-length coding) circuit 102, an inverse quantization circuit 103, and an inverse DCT circuit 104. An adding circuit 105 forms a reconstructed frame of video data on the basis of a difference signal provided from the inverse DCT circuit 104 and predictive picture data (reference data) provided from a motion compensation circuit 106. The resulting reconstructed video data is stored in a frame memory 107.

The motion compensation circuit 106 forms the predictive picture data from reconstructed data previously stored in frame memory 107 on the basis of motion compensation information (including, for example, motion vectors) extracted from the input signal and supplied to the motion compensation circuit 106 by the inverse VLC circuit 102. Alternatively, with respect to frames for which predictive coding was not performed, such as "intra-frame" coded data, the motion compensation circuit 106 simply provides the value "0" to the adder 105. Reconstructed frames of video data are output from the frame memory 107 via a digital-to-analog converter 108 for display by a display device 109.

As the number of pixels in each frame of the video signal has increased from, for example, the 352×240 frame used for video telephone to the 720×480 frame used in the NTSC format or the 1920×1024 frame in a HDTV (high definition television) system, it was found to be difficult to perform the necessary processing using only one processor and one program execution sequence. For this reason, it has been proposed to divide each frame of the video data into a plurality of subframes, as illustrated in FIG. 16, and then to provide a respective processor for each of the plurality of subframes, so that coding and decoding are performed with parallel processing by the plurality of processors. For example, FIG. 15 is a block diagram of a decoding system provided in accordance with this proposal.

In the system of FIG. 15, input sequences of encoded video data, each representing a respective subframe, are respectively provided via input terminals 110–113 to processors (decoder blocks) 114–117. The processors 114–117 decode the respective data sequences based upon data supplied from frame memories 119–122, which store respective subframes and are assigned to respective ones of the processors 114–117. For example, processor 114 stores a subframe of decoded data in the memory 119. In order to provide motion compensation, a switching logic circuit 118 provided between the processors 114–117 and the frame memories 119–122, permits the processor 114 to read out data from an adjacent portion of the frame memory 120 as well as from all of frame memory 119. The switching logic circuit 118 also provides frames of output video data from the memories 119–120, via a digital-to-analog converter 123 for display on a display device 124.

The four data sequences respectively provided to the processors 114–117 can, for practical purposes, be combined into a single data sequence by providing headers for controlling multiplexing of the data sequence. For this purpose, a separation block (not shown) is provided upstream from the decoder for separating the combined data sequence into the four sequences to be provided to the respective processors. Examples of parallel processing techniques which use division of a video frame into subframes are disclosed in U.S. Pat. No. 5,138,447 and Japanese Patent Application Laid Open No. 139986/1992 (Tokkaihei 4-139986).

As just described, according to the conventional approach, the video frame was generally divided into subframes which were processed in parallel by respective processors. However, when a frame is divided in this manner, there are restrictions on the extent to which the processors can access data that is outside of the processor's respective subframe. Although, as indicated above, a processor can access a region that adjoins its respective subframe, the extent of such access is limited in order to keep the scale of the switching logic circuit 118 from becoming unduly large. As a result, the degree of compression efficiency is reduced, and there are variations in the quality of the reproduced picture at the boundary between the subframes, which may result in visible artifacts at the subframe boundary.

In addition, the processing for compression-coding is carried out completely separately for each of the subframes, which makes it impossible to provide compression-coding on the basis of data blocks in other subframes, a limitation that is not present when the frame is not divided into subframes. Accordingly, the compression coding method must be changed to accommodate the division into subframes, resulting in a lack of compatibility and a loss in compression efficiency.

Furthermore, if header data is added to the data sequence to be recorded or transmitted in order to provide for multiplexing the data sequence into the respective sequences provided to the parallel processors, the additional header data increases the overhead in the recorded data with a corresponding loss of efficiency, and it may also be necessary to change the coding procedure, and so forth.

OBJECTS AND SUMMARY OF THE INVENTION

Accordingly, it is an object of the present invention to provide an apparatus and method for decoding a video signal with parallel processing in a manner that avoids the above-described restrictions upon compression-coding.

It is another object of the invention to provide a method and apparatus for decoding a video signal in which a plurality of memory units and motion compensation devices are operated in parallel to process video data encoded according to a known standard, and without limiting the range of motion vectors used for predictive coding or requiring similar restrictions on motion predictive compression-coding.

In accordance with an aspect of the present invention, there is provided an apparatus for decoding a coded video signal that represents an image frame, the coded video signal having been divided into a plurality of slices, each of the slices being a sequence of macroblocks. Each of the macroblocks is a two-dimensional array of picture elements of the image frame, and the coded signal is a bit stream which represents a sequence of the slices which together represent the image frame. The bit stream also includes a plurality of synchronizing code signals, each of which is associated with a respective one of the slices and indicates the beginning of the respective slice. According to this aspect of the invention, the apparatus includes a plurality of decoding circuits, each of which decodes a respective portion of the coded signal that represents the image frame, and a distributing circuit responsive to the synchronizing code signals for distributing the slices among the plurality of decoding circuits.

According to another aspect of the invention, there is provided an apparatus for decoding input signal blocks that were formed by transform encoding and then variable-length encoding blocks of video data, with the apparatus including a decoding circuit for variable-length decoding a series of the input signal blocks, a parallel data circuit which forms plural parallel data streams, each of which includes respective ones of the series of input signal blocks which were variable-length decoded by the decoding circuit, and a plurality of inverse transform circuits, each of which receives a respective one of the parallel data streams and performs inverse transform processing on the variable-length decoded signal blocks in the respective data streams.

According to a further aspect of the invention, in the apparatus just described the decoding circuit is one of a plurality of decoding circuits for variable-length decoding respective series of input signal blocks, and the apparatus further includes a distributing circuit for forming the respective series of input signal blocks to be decoded by the plural decoding circuits from a bit stream representing an image frame, and the respective series of input signal blocks are formed in response to synchronizing signals provided at predetermined intervals in the bit stream representing the image frame.

According to yet another aspect of the invention, there is provided an apparatus for decoding an input digital video signal which includes groups of blocks of prediction-coded difference data, with each of the groups consisting of a predetermined plurality of the blocks and having a respective motion vector associated with the group. Each of the blocks of the prediction-coded difference data had been formed on the basis of the respective motion vector associated with the respective group which includes the block. The apparatus according to this aspect of the invention includes an output circuit for supplying in parallel blocks of prediction-coded difference data contained in one of the groups of blocks, a reference data circuit for supplying in parallel plural blocks of reference data, with each of the blocks of reference data being formed on the basis of the motion vector associated with that group of blocks, and each of the blocks of reference data corresponding to one of the blocks of prediction-coded difference data supplied by the output circuit. The apparatus also includes a plurality of adding circuits each of which is connected to the output circuit and the reference data circuit and each of which adds a respective one of the blocks of prediction-coded difference data and the corresponding block of reference data.

According to further aspects of the invention, the reference data circuit includes a plurality of reference data memories from which reference data is read out in parallel on the basis of the motion vector associated with that group of blocks, a plurality of buffer memories for temporarily storing reference data read out from the plurality of reference data memories and a distribution circuit. According to one alternative embodiment of this aspect of the invention, each of the buffer memories is associated with a respective one of the reference data memories and is controlled on the basis of the motion vector for reading out the reference data temporarily stored therein, and the distributing circuit is connected between the buffer memories and the adding circuits and distributes the reference data stored in the buffer memories among the adding circuits on the basis of the motion vector. According to another alternative embodiment of this aspect of the invention, each of the buffer memories is associated with one of the adding circuits and the distributing circuit is connected between the reference data memories and the buffer memories for distributing among the buffer memories, on the basis of the motion vector associated with that group of blocks, the reference data read out from the reference data memories.

According to yet another aspect of the invention, there is provided a method of decoding a prediction-coded video signal that represents an image frame, with the prediction-coded video signal having been divided into a plurality of macroblocks, each of the macroblocks being a two-dimensional array of picture elements of the image frame, and the method including the steps of providing a plurality of memories each for storing reference data which corresponds to a respective portion of the image frame and which together store reference data which represents a complete image frame, and distributing data representing a reconstructed image frame for storage in the plurality of memories such that a portion of each macroblock of the reconstructed image frame is stored in each of the plurality of memories.

According to alternative further aspects of the invention, the data representing each macroblock is distributed block-by-block among the plurality of memories or line-by-line in a cyclical fashion among the plurality of memories.

In a video signal decoding apparatus according to the invention, the input coded signal is distributed for parallel processing among several decoding circuits on the basis of synchronizing code signals that are provided in the signal in accordance with a conventional coding standard. In this way, parallel decoding can be precisely carried out on the basis of synchronizing signals provided in accordance with a conventional coding method and during time periods available between the synchronizing signals. In this way, restrictions on the conventional coding method can be avoided.

In addition, in the video signal decoding apparatus according to the invention, the data is sequenced on the basis of "slices" which are a standard subdivision of a video frame constituting a plurality of macroblocks and the slices of data are distributed among decoding circuits so that high speed parallel decoding may be carried out.

Further, each of the blocks making up a macroblock is distributed to a respective inverse transformation circuit so that inverse transform processing can be carried out simultaneously in parallel for all of the blocks of a macroblock, and the inverse transform blocks are then combined, in parallel, with reference data to recover the video signal which had been predictive-coded. The reference data, in turn, is provided from parallel memories at the same time on the basis of the motion compensation vector for the particular macroblock, and in such a way that there is no need to place restrictions on the motion-compensation carried out during the predictive coding. For example, there is no need to limit the range of the motion vector.

The above, and other objects, features and advantages of the present invention will be apparent from the following detailed description thereof which is to be read in connection with the accompanying drawings.

DETAILED DESCRIPTION OF THE PREFERRED EMBODIMENTS

A preferred embodiment of the invention will now be described, initially with reference to FIG. 1.

Figure 1:
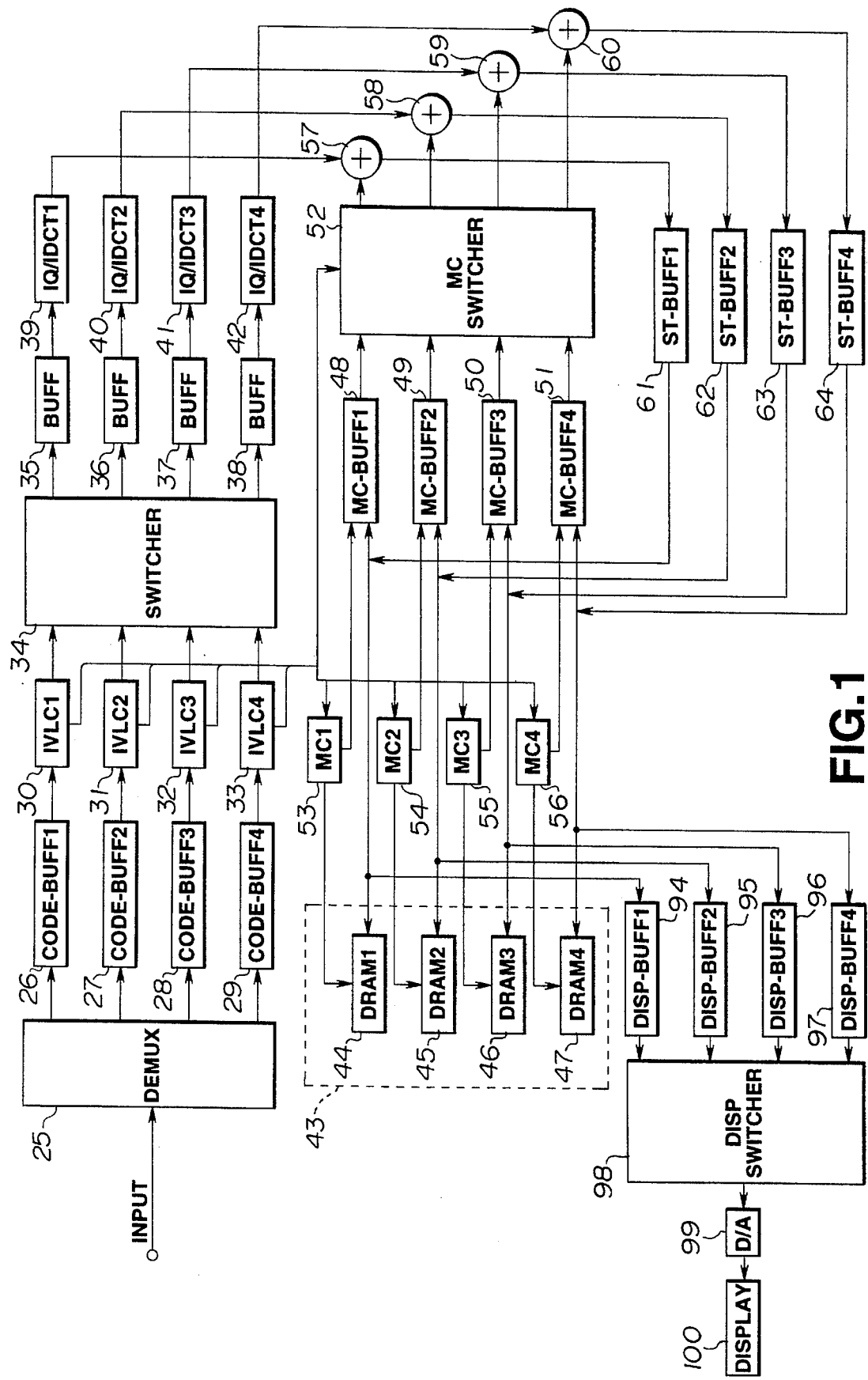
FIG. 1 is a block diagram of an embodiment of an apparatus for decoding a moving picture video data signal in accordance with the present invention.

FIG. 1 illustrates in block diagram form an apparatus for decoding a moving picture video data signal that has been coded according to a proposed MPEG standard system.

An input bit stream representing the coded video data signal is provided to a demultiplexer 25, by means of which the input signal is distributed, slice-by-slice, to code buffers 26–29.

Figure 2:
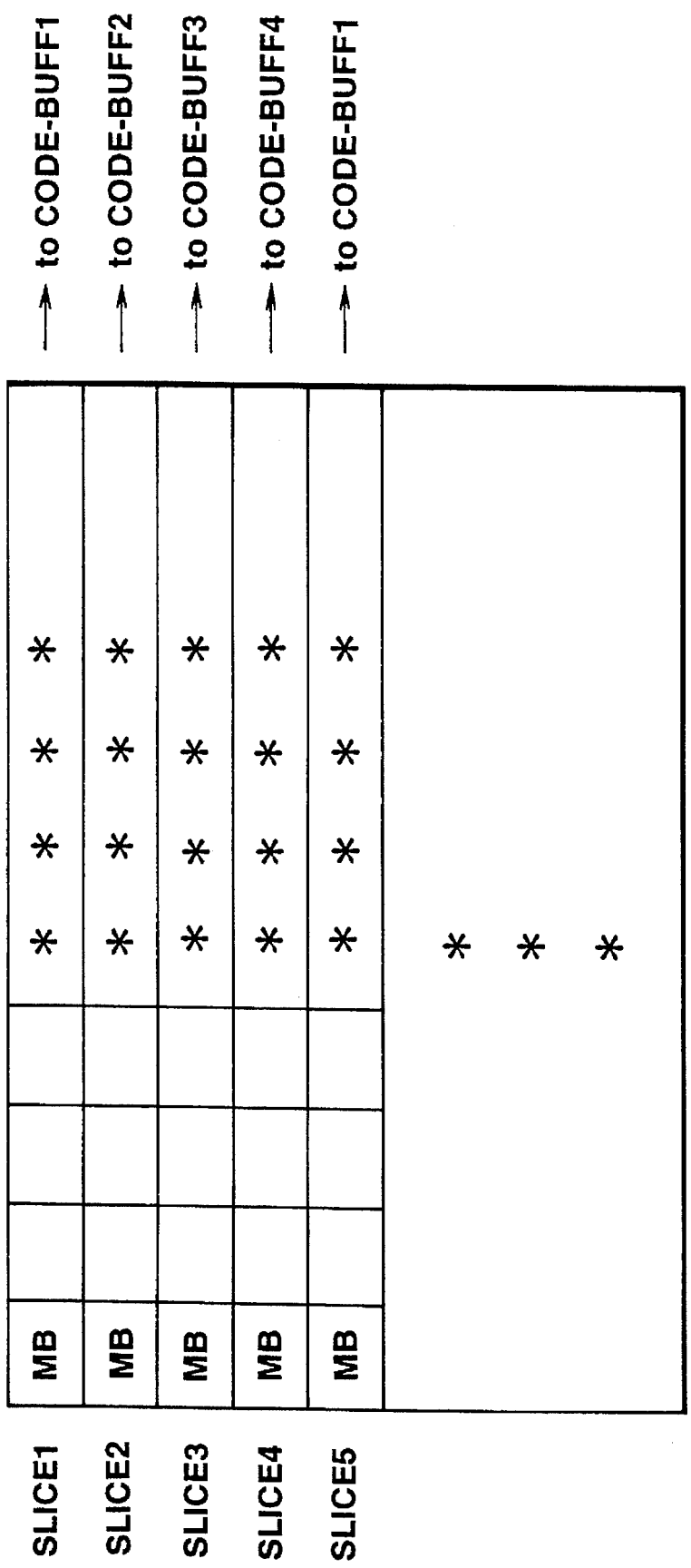
FIG. 2 is a schematic illustration of a manner in which video data corresponding to an image frame is distributed for decoding in accordance with the present invention.

FIG. 2 illustrates the slice-by-slice distribution of the input data. As is well known to those who are skilled in the art, each slice is a sequence of macroblocks transmitted in raster scanning order. The starting point of each slice is indicated by a synchronizing code signal, and the slices are provided so that transmission errors and the like can be confined to a single slice, because after an error occurs, proper coding can resume at the synchronizing code signal provided at the beginning of the subsequent slice. Accordingly, the demultiplexer 25 is provided with a circuit which detects the synchronizing code signals, and distribution of the input signal among the code buffers 26–29 is carried out in response to the detected synchronizing code signals.

As is also well known, the motion vectors provided with respect to each macroblock, and the DC coefficients for each block, are differentially encoded. In other words, only the difference between respective motion vectors for the current macroblock and the preceding macroblock is encoded and transmitted, and also, only the difference between the respective DC coefficient for the present block and that of the preceding block are coded and transmitted.

As indicated in FIG. 2, the first, fifth, ninth, etc. slices of each image frame are stored in the first code buffer 26, and these slices are provided for variable-length decoding by a variable-length decoder circuit 30. Similarly, the second, sixth, tenth, etc. slices of the image frame are stored in the second code buffer 27 for variable-length decoding by variable-length decoder circuit 31; the third, seventh, eleventh, etc. slices are stored in the third code buffer 28 for variable-length decoding by the variable-length decoder circuit 32; and the fourth, eighth, twelfth, etc. slices are stored in the fourth code buffer 29 for variable-length decoding by the variable-length decoder circuit 33.

According to the example shown in FIG. 2, the number of macroblocks in each slice is fixed, so that it will not be necessary for any of the variable-length decoders to wait. As a result, decoding carried on by the variable-length decoders is synchronized and is carried out efficiently.

It will be understood that, although the number of macroblocks per slice is fixed, the number of bits per slice in the input signal will vary because of variable-length encoding. Nevertheless, the number of macroblocks per slice output by each variable-length decoding circuit is the same according to this example.

In the example shown in FIG. 2, each slice is shown as being one macroblock high and extending horizontally entirely across the image frame, so that each slice consists of one row of macroblocks. However, it is also within the contemplation of this invention to provide for slices having a fixed length in terms of macroblocks that is longer or shorter than one row of macroblocks. It is further contemplated that the number of macroblocks per slice may be variable within each frame and/or from frame to frame and that the positions of slices within a frame may vary. In case variable-length slices are provided within a frame, it will be appreciated that the number of macroblocks distributed to each of the variable-length decoders may be unbalanced, in which case some of the variable-length decoders may be required to output filler macroblocks (all zeros for example) until other decoders have "caught up". Furthermore, it is provided that variable-length decoding of slices from the next image frame will not proceed until all of the slices of the current frame have been variable-length decoded.

It will be recognized that any loss of decoding efficiency that results from the occasional need to interrupt the processing by some of the variable length decoders is compensated for by the fact that the coding can be performed with slices that have a variable length in terms of macroblocks.

Details of the variable-length decoding processing will now be described.

Figure 3:
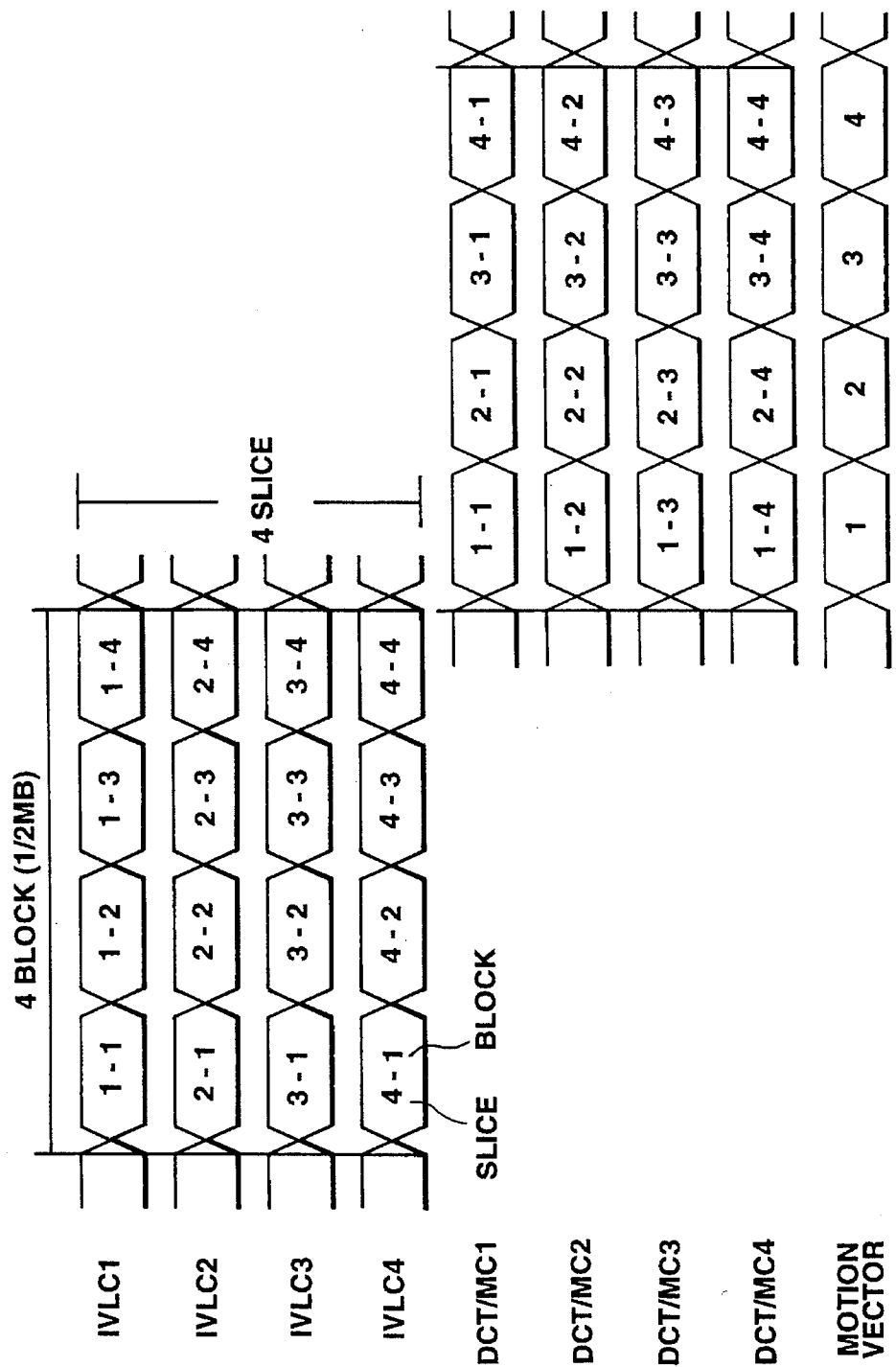
FIG. 3 is a timing diagram which illustrates operation of a buffer memory provided in the apparatus of FIG. 1.

Data which has been decoded by the respective variable length decoders are transferred to buffer memories 35–38 by way of switcher 34. FIG. 3 illustrates the manner in which data is distributed to, and output from, the buffer memories 35–38. It will be noted that, upstream from the buffers 35–38, processing had been performed in a slice-wise parallel manner, but downstream from the buffers 35–38 processing is performed in a block-wise parallel manner. In particular, the four blocks of luminance data making up a macroblock are output in parallel from respective ones of the buffer memories 35–38. (It will be understood that a macroblock also includes chrominance blocks. For example, in the 4:2:2 format, each macroblock includes four blocks of chrominance data in addition to the four blocks of luminance data. The discussion from this point forward will deal only with the luminance data blocks, it being understood that the corresponding four chrominance data blocks can be processed in a similar manner.)

Referring again to FIG. 3, it will be seen that the variable length decoders 30–33 respectively output simultaneously the first blocks of the first through fourth slices. The respective first blocks are distributed among the buffer memories 35–38 so that the first block of the first slice (i.e., the first block of the first macroblock of the first slice) is stored in the first buffer memory 35, the second block of the first slice is stored in the second buffer memory 36, the third block of the first slice is distributed to the third buffer memory 37, and the fourth block of the first slice is distributed to the fourth buffer memory 38. As a result, all four blocks of a single macroblock can be read out in parallel by the respective buffer memories 35–38, so that block-wise parallel processing can be accomplished downstream. Such processing includes conventional inverse transform processing in accordance with zig-zag scanning.

In the example just discussed, each buffer memory preferably has two banks which each have the capacity of storing four data blocks.

The block-wise parallel data provided from the buffer memories 35–38 is subjected to inverse quantization and inverse discrete cosine transform processing in parallel at processing blocks 39–42. Thereafter, motion compensation processing for the four blocks of the macroblock is also carried out in parallel. Reference picture data for each macroblock is extracted from previously reproduced (i.e., previously reconstructed) image data stored in a frame memory 43. The reference picture data is formed on the basis of the motion vector which corresponds to the macroblock being processed and is used to form decoded data in combination with difference data output from the processing blocks 39–42. In this example, since motion compensation processing is carried out in parallel for each macroblock (four blocks) of luminance data, the motion vectors provided to motion compensation processing blocks 53–56 from the variable length decoders 30–33 always correspond to each other at any given time. For this reason, an MC (motion compensation) switcher 52 is used to switch a data bus, so that it is possible to provide motion compensation processing of the reference data transferred to MC buffer memories 48–51 in such a manner that memory accessing by the motion compensation processing blocks 53–56 does not overlap. As a result, the motion compensation search range, and accordingly the permissible range of the motion vector, is not limited. Details of motion compensation processing will be provided below.

Reproduced decoded image data formed in parallel at adders 57–60 is stored via four parallel processing paths in the frame memory 43 by way of storage buffers 61–64. Moreover, sequences of images for which the reproduced (reconstructed) data is stored in memory 43 are output to a digital-to-analog converter 99 through display buffer memories 94–97, and a display switcher 98 which is switched according to appropriate display timing. The D/A converted signal is then displayed on a display device 100.

There will now be described, with reference to FIG. 4, details of a buffering arrangement provided upstream from the variable length coders of the apparatus of FIG. 1.

Figure 4:
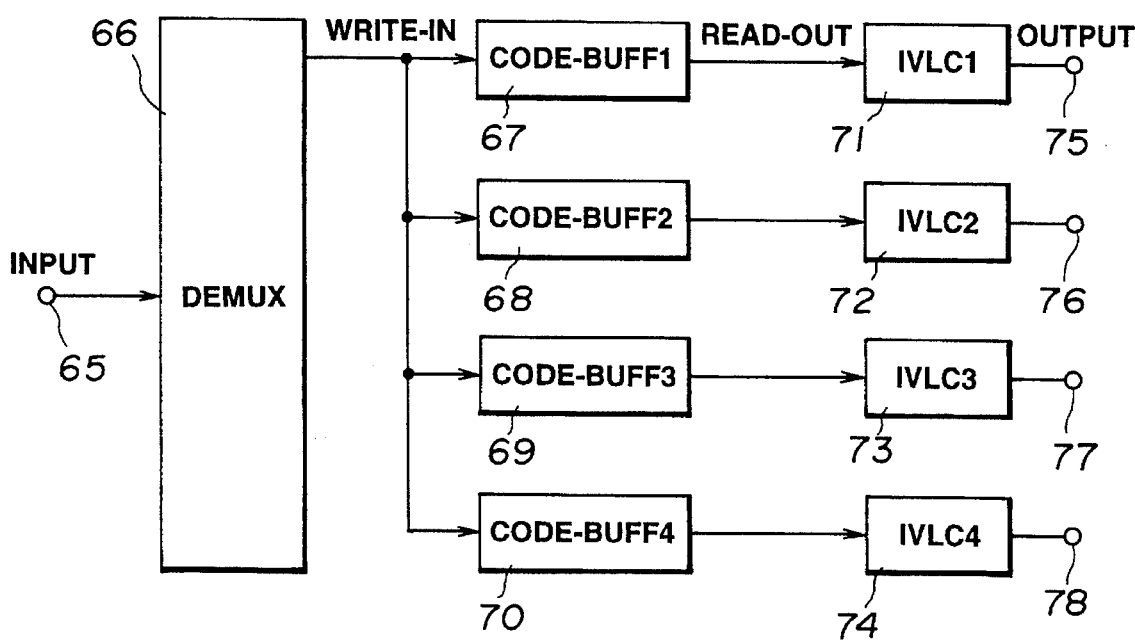
FIG. 4 is a block diagram which illustrates a code buffering arrangement provided upstream from variable-length decoder circuits provided in the apparatus of FIG. 1.

As shown in FIG. 4, an input signal bit stream is received at an input terminal 65 and provided therefrom to a demultiplexer 66 which divides the bit stream at the beginning of each slice and distributes the slices among code buffer memories 67–70. The slices of data are output respectively from the code buffer memories 67–70 to variable-length decoders 71–74, and variable-length decoded data is respectively output from each of the variable-length decoders 71–74 via output terminals 75–78.

The buffering and decoding operations carried out by the circuitry shown in FIG. 4 will now be described with reference to the timing diagram shown in FIG. 5.

In particular, the input bit stream received at the terminal 65 is divided at the beginning of each slice by the demultiplexer 66. Because synchronizing code signals indicative of the beginning of each slice are included at intervals corresponding to a plural number of macroblocks (such intervals each being referred to as a slice), the synchronizing code signals are detected at the demultiplexer 66 for the purpose of performing the division of the bit stream into slices.

Figure 5:
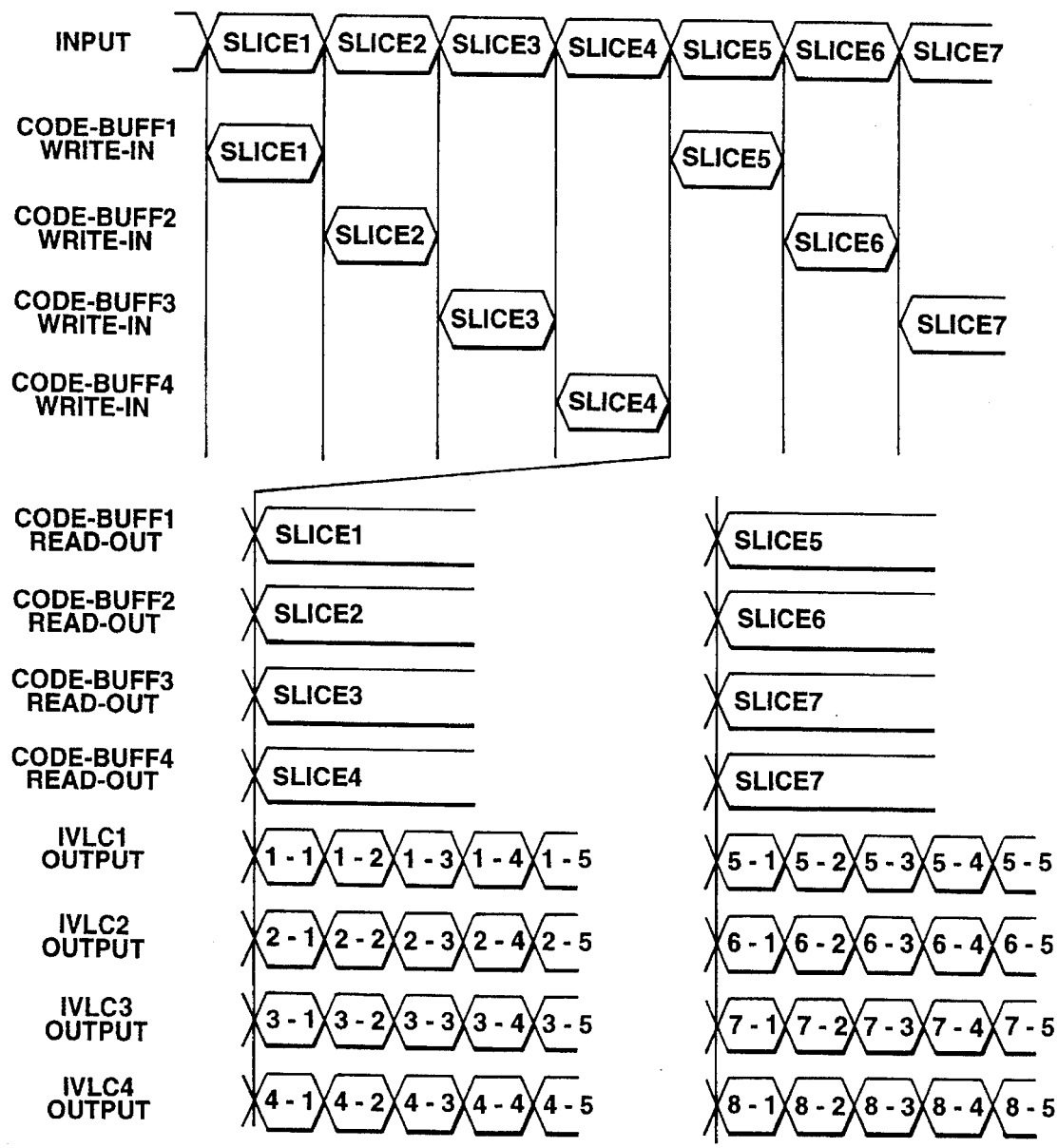
FIG. 5 is a timing diagram which illustrates operation of the code buffering arrangement shown in FIG. 4.

As shown in FIG. 5, a sequence of the resulting slices are written in a cyclical fashion into the code buffer memories 67–70. In particular, slice 1, slice 5, slice 9, etc. are written into the code buffer memory 67; slice 2, slice 6, slice 10, etc. are written into the code buffer memory 68; slice 3, slice 7, slice 11, etc. are written into the code buffer memory 69; and slice 4, slice 8, slice 12, etc. are written into the code buffer memory 70.

At a point when slice 4 has been written into the code buffer memory 70, the slices 1–4 are respectively read out in parallel from the code buffer memories 67–70 to the four variable-length decoders 71–74 and variable-length decoding begins.

The variable-length decoders 71–74 each complete decoding processing of a macroblock from a respective slice within the same time. Decoded data produced by variable-length decoder 71 is output via terminal 75; decoded data produced by variable-length decoder 72 is output via terminal 76; decoded data produced by variable-length decoder 73 is output via terminal 77; and decoded data produced by variable-length decoder 74 is output via terminal 78. All of the decoded data is supplied to the switcher 34 (FIG. 1). In addition, decoded motion vector data is provided from the variable-length decoders to the MC switcher 52 and motion compensation processing blocks 53–56.

It should be understood that, in FIG. 5, the symbol "1-1" shown in the output of IVLC1 (variable-length decoder 71) is indicative of the first block of slice 1. Similarly, for example, "4-1" shown in the output of IVLC4 (variable-length decoder 74) is indicative of the first block of slice 4.

Figure 6:
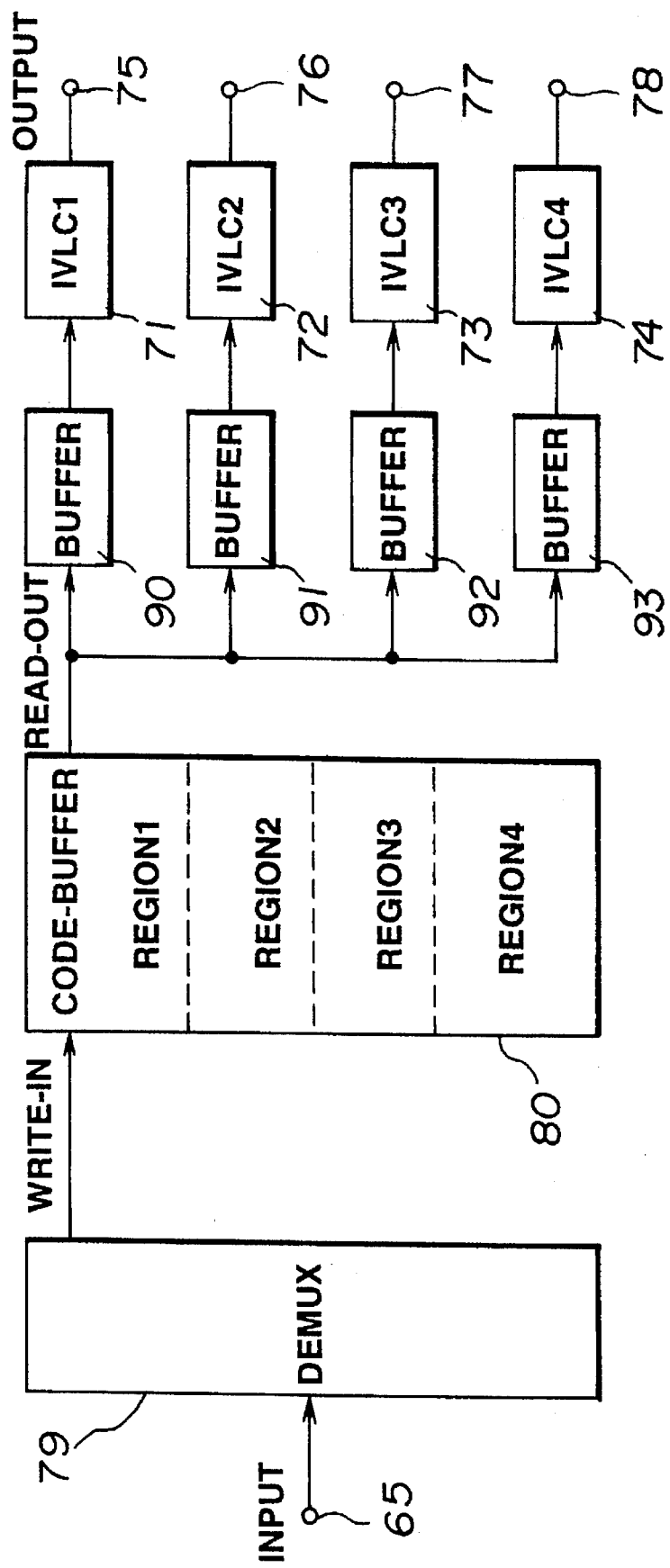
FIG. 6 is a block diagram which shows an alternative code buffering arrangement provided upstream from variable-length decoder circuits provided in the apparatus of FIG. 1.

An alternative code buffering arrangement provided upstream from the variable-length decoders is shown in FIG. 6.

In FIG. 6, the input bit stream is again received at an input terminal 65 and provided therefrom to a demultiplexer 79, at which the bit stream is divided at the beginning of each slice. Immediately downstream from the demultiplexer 79 is a code buffer memory 80 which has respective regions in each of which a slice of data can be stored. Additional buffer memories 90–93 are provided downstream from the buffer memory 80. In a similar manner to the arrangement of FIG. 4, the buffered data output from each of the buffer memories 90–93 is provided to a respective one of the variable-length decoders 71–74, and the decoded data output from the variable-length decoders 71–74 is provided at respective output terminals 75–78.

Operation of the code buffering arrangement shown in FIG. 6 will now be described with reference to the timing diagram of FIG. 7.

As before, the input bit stream provided from the terminal 65 is divided at the beginning of each slice by the demultiplexer 79 on the basis of synchronizing code signals provided at intervals corresponding to a number of macroblocks.

Figure 7:
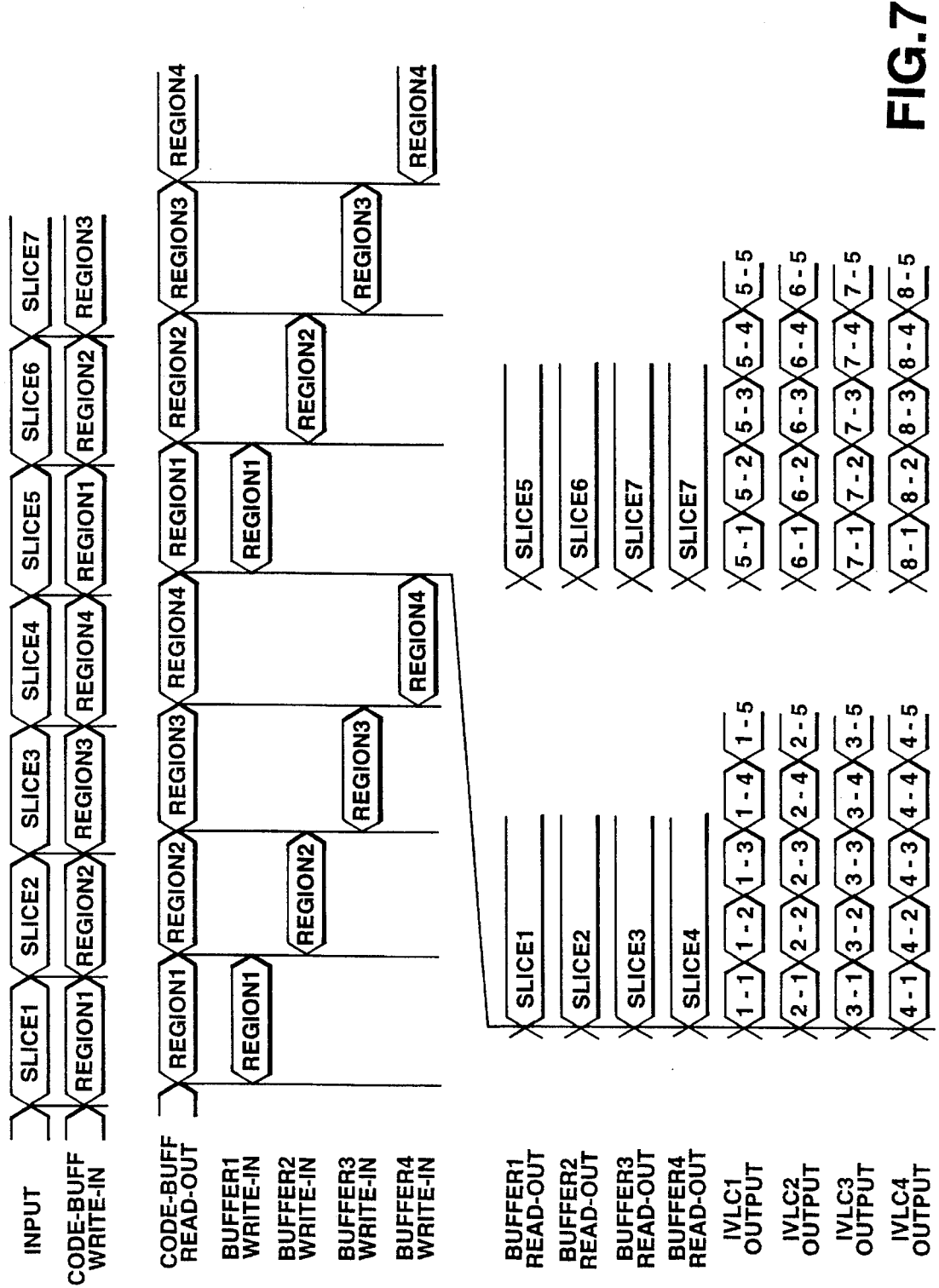
FIG. 7 is a timing diagram which illustrates operation of the code buffering arrangement shown in FIG. 6.

As shown in FIG. 7, respective slices are written in a cyclical fashion into the regions 1–4 of the buffer memory 80. In particular, slice 1, slice 5, slice 9, etc. are written into region 1; slice 2, slice 6, slice 10, etc. are written into region 2; slice 3, slice 7, slice 11, etc. are written into region 3; and slice 4, slice 8, slice 12, etc. are written into the region 4.

At a point when slice 4 has been written into region 4, the data stored in the four regions are sequentially read out from the code buffer memory 80. As a result, slices 1, 5, 9, etc. are read out from region 1 and written into buffer memory 90; slices 2, 6, 10, etc., are read out from region 2 and written into buffer memory 91; slices 3, 7, 11, etc. are read out from region 3 and written into buffer memory 92, and slices 4, 8, 12, etc. are read out from region 4 and written into buffer memory 93.

At a time when the contents of region 4 have been written into the buffer memory 93, the data respectively stored in the buffer memories 90–93 is read out in parallel to the variable-length decoders 71–74, and decoding processing starts at that time.

The variable-length decoders 71–74 each complete the decoding processing of a respective macroblock within the same time. Decoded data produced by variable length decoder 71 is output via terminal 75; decoded data produced by variable-length decoder 72 is output via terminal 76; decoded data produced by variable-length decoder 73 is output via terminal 77; and decoded data produced by variable-length decoder 74 is output via terminal 78. This decoded data is supplied to the switcher 34, and in addition, decoded motion vector data is supplied from the variable-length decoders to MC switcher 52 and to motion compensation processing blocks 53–56.

As was the case with FIG. 5, in FIG. 7 the symbol "1-1" is indicative of the first block in slice 1, which is decoded by variable-length decoder 71, while "4-1" is indicative of the first block of slice 4, which is decoded by the variable-length decoder 74.

With respect to the buffering arrangement shown in FIG. 4, it is possible to use certain distribution methods with respect to input data streams which have a processing unit which is shorter than a slice and are included in a layer (known as an "upper layer") which has processing units which are longer than a slice. With respect to an input data stream which has such a format, it is possible to simultaneously write the upper layer into the code buffer memories 67–70 in order to provide parallel data to the variable-length decoders 71–74. Alternatively, the bit stream for the upper layer can be written into one of the four code buffer memories so that the upper layer is decoded by only one of the four variable-length decoders, with parameters being set at the other variable-length decoders. According to another possible method, an additional processor is provided to decode the upper layer bit stream so as to set parameters at the four variable-length decoders.

On the other hand, using the arrangement shown in FIG. 6, the upper layer bit stream can be written into one of the four regions of the buffer memory 80 and the contents of that region can be simultaneously written into the buffer memories 90–93 for parallel processing by the variable-length decoders 71–74. According to an alternative method, the upper layer bit stream is written into one of the four regions of the buffer memory 80 so that the data is written into one of the four buffer memories 90–93 and is then decoded by one of the four variable-length decoders in order to set parameters at the other variable-length decoders.

According to another alternative method, a separate processor is provided to decode the upper layer bit stream in order to set parameters at the four variable-length decoders. As a further method, the demultiplexer 79 repeatedly writes the upper layer bit stream into the four regions of the buffer memory 80 so that the data is simultaneously written from each region into the buffer memories 90–93 for parallel processing in the variable-length decoders 71–74.

In these ways, distribution of the data stream, and parallel processing thereof, can be carried out on the basis of parameters included in the data stream.

Details of decoding processing with respect to motion-compensated predictive-coded data will now be described.

Figures 8A, 8B, 8C:
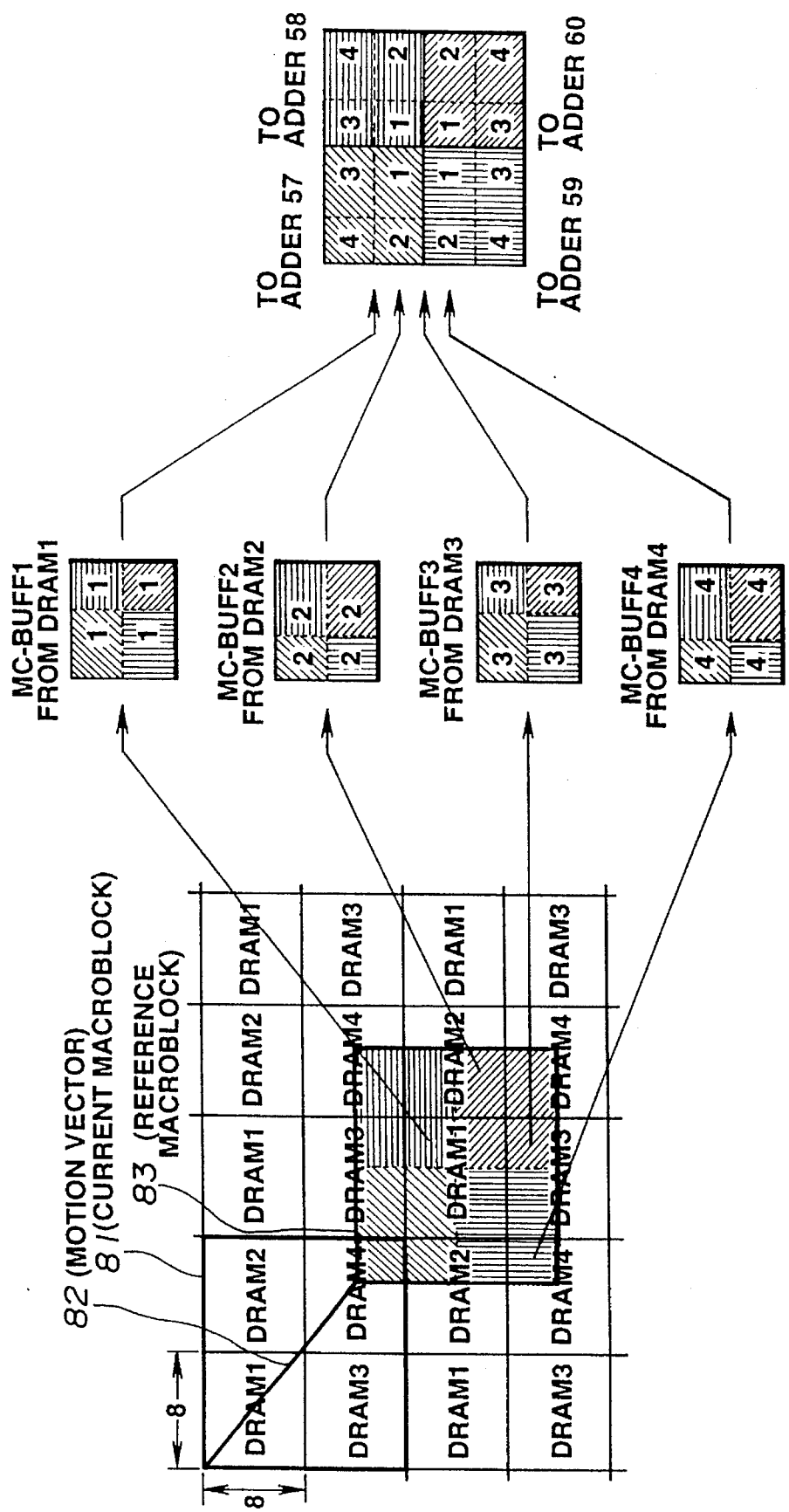
FIGS. 8(A), 8(B) and 8(C) together schematically illustrate a manner in which reference data is provided on the basis of a motion vector to adders that are part of the apparatus of FIG. 1.

FIG. 8(A) illustrates a manner in which reference image data is distributed among and stored in DRAMs 44–47 making up the frame memory 43. Each image frame is, as indicated above, divided into macroblocks, and each macroblock is formed of four blocks. Each of the four blocks is, in this particular example, an 8×8 array of pixel elements, and each of the blocks constitutes one of four quadrants of its respective macroblock. The data with respect to each macroblock is divided among the four DRAMs 44–47. In particular, all of the first blocks (upper left blocks) of all of the macroblocks are stored in DRAM 44, all of the second blocks (upper right blocks) of all of the macroblocks are stored in DRAM 45, all of the third blocks (lower left blocks) of all of the macroblocks are stored in DRAM 46, and all of the fourth blocks (lower right blocks) of all of the macroblocks are stored in DRAM 47. Accordingly, it will be seen that the reference data is distributed among DRAMs 44–47 in a checkered pattern.

Continuing to refer to FIG. 8(A), the square labeled 81 represents the geometric area of the image frame which corresponds to the macroblock which is currently being decoded (reconstructed), and reference numeral 82 represents the motion vector associated with that macroblock, according to the example shown in FIG. 8(A). In addition, the reference numeral 83 represents the reference data stored in the DRAMs 44–47 and indicated by the motion vector 82 as corresponding to the current macroblock 81. The data represented by the shaded square 83 is read out from the DRAMs 44–47 under control of motion compensation processing blocks 53–56 on the basis of the motion vector 82. In particular, the data corresponding to the "DRAM1" portion of the square 83 (i.e., a central portion of the square 83) is read out from DRAM 44 to motion compensation buffer 48 under the control of motion compensation processing block 53. Similarly, the portions of the shaded square 83 which overlap with squares labeled "DRAM2" (i.e., central portions of the left and right sides of the square 83) are read out from DRAM 45 to motion compensation buffer 49 under control of motion compensation processing block 54. Also, the portions of the shaded square 83 which overlap the squares labeled "DRAM3" (i.e., the central portions of the upper and lower edges of the square 83) are read out from DRAM 46 to motion compensation buffer 50 under control of motion compensation processing block 55. Finally, the portion of the shaded square 83 which overlaps with squares labeled "DRAM4" (i.e., corner regions of the square 83) are read out from the DRAM 47 to motion compensation buffer 51 under control of motion compensation processing block 56.

FIG. 8(B) is a schematic illustration of the reference data read out from the respective DRAMs 44–47 and stored in respective motion compensation buffers 48–51. This data stored in the four motion compensation buffers 48–51 represents the reference data for the macroblock which is currently to be reconstructed. However, the data as stored in the individual motion compensation buffers does not correspond to the data required for each of the adders 57–60. Therefore, the MC switcher 52 is provided between the motion compensation buffers 48–51 and the adders 57–60 so that the correct reference data is distributed from the motion compensation buffers to the adders. The reference data which is supplied to each of the adders 57–60 is schematically illustrated in FIG. 8(C).

Figure 9:
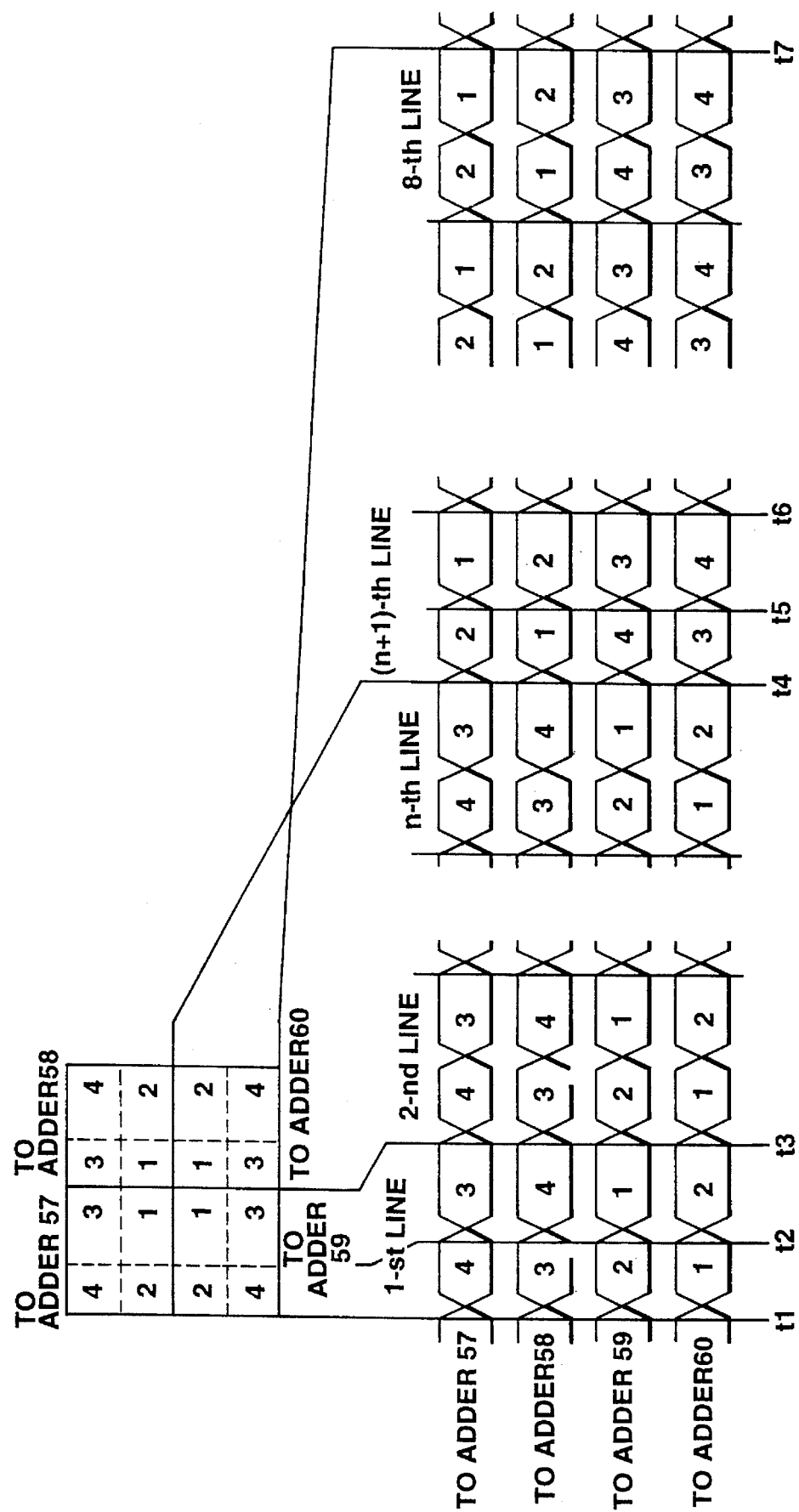
FIG. 9 is a timing diagram which illustrates an operation for providing reference data to the adders which are part of the apparatus of FIG. 1.

FIG. 9 illustrates the timing, according to the example shown in FIG. 8(A), at which data read out from the motion compensation buffers 48–51 is routed among the adders 57–60.

The processing of the four blocks making up the macroblock proceeds, as indicated before, in parallel, with the respective first lines of each of the blocks being processed simultaneously, then the second lines, and so forth. With respect to the first lines of the blocks, initially, at a starting time t1 (FIG. 9), data from motion compensation buffer 51 is routed to adder 57, data from motion compensation buffer 50 is routed to adder 58, data from motion compensation buffer 49 is routed to adder 59, and data from motion compensation buffer 48 is routed to adder 60. At a changeover point in the processing of the first lines, indicated by time t2 in FIG. 9, the routing is changed so that data from motion compensation buffer 50 is routed to adder 57, data from motion compensation buffer 51 is routed to adder 58, data from motion compensation buffer 48 is routed to adder 59, and data from motion compensation buffer 49 is routed to adder 60. This routing state continues until the end of the first line (indicated by time t3) and then the procedure that was followed for the first lines is carried out again with respect to the second lines. The same procedure is then continued through the nth lines, but upon completion of the nth lines of the block, as indicated at time t4, a different routing pattern is established for the beginning of the (n+1)th lines. According to this pattern, data from motion compensation buffer 49 is provided to adder 57, data from motion compensation buffer 48 is provided to adder 58, data from motion compensation buffer 51 is provided to adder 59, and data from motion compensation buffer 50 is provided to adder 60. This routing arrangement continues until a changeover point in the (n+1)th lines, indicated by time t5, at which the routing arrangement is changed so that data from motion compensation buffer 48 is routed to adder 57, data from motion compensation buffer 49 is routed to adder 58, data from motion compensation buffer 50 is routed to adder 59, and data from motion compensation buffer 51 is routed to adder 60. On the completion of the process for the (n+1)th line (indicated by time t6), the procedure carried out for the (n+1)th lines is repeated with respect to each of the remaining lines of the blocks until the last (eighth) lines have been processed, at which point (indicated by time t7) processing for the macroblock is complete. Processing for the next macroblock then begins, on the basis of the motion vector associated with the next macroblock.

It will be appreciated that the reference data supplied to the adders 57–60 is added by the adders to the current difference data supplied thereto from the processing circuits 39–42 so that macroblocks of reconstructed image data are produced. It will also be recognized that the storage of the reference data according to the above-described checkered pattern in the frame memory 43, and the above-described method of reading out, buffering, and switching the reference data makes it possible to provide motion-compensation decoding processing without any restriction on the range of the motion vector, and in such a manner that memory accesses do not overlap.

In the embodiment illustrated in FIG. 1, the MC switcher 52 is provided between the motion compensation buffers 48–51 and the adders 57–60. However, according to an alternative embodiment, shown in FIG. 10, the MC switcher 52 can be provided between the DRAMs 44–47 and the motion compensation buffers 48–51, with each of the buffers 48–51 connected directly to, and providing data exclusively to, a respective one of the adders 57–60.

Figure 10:
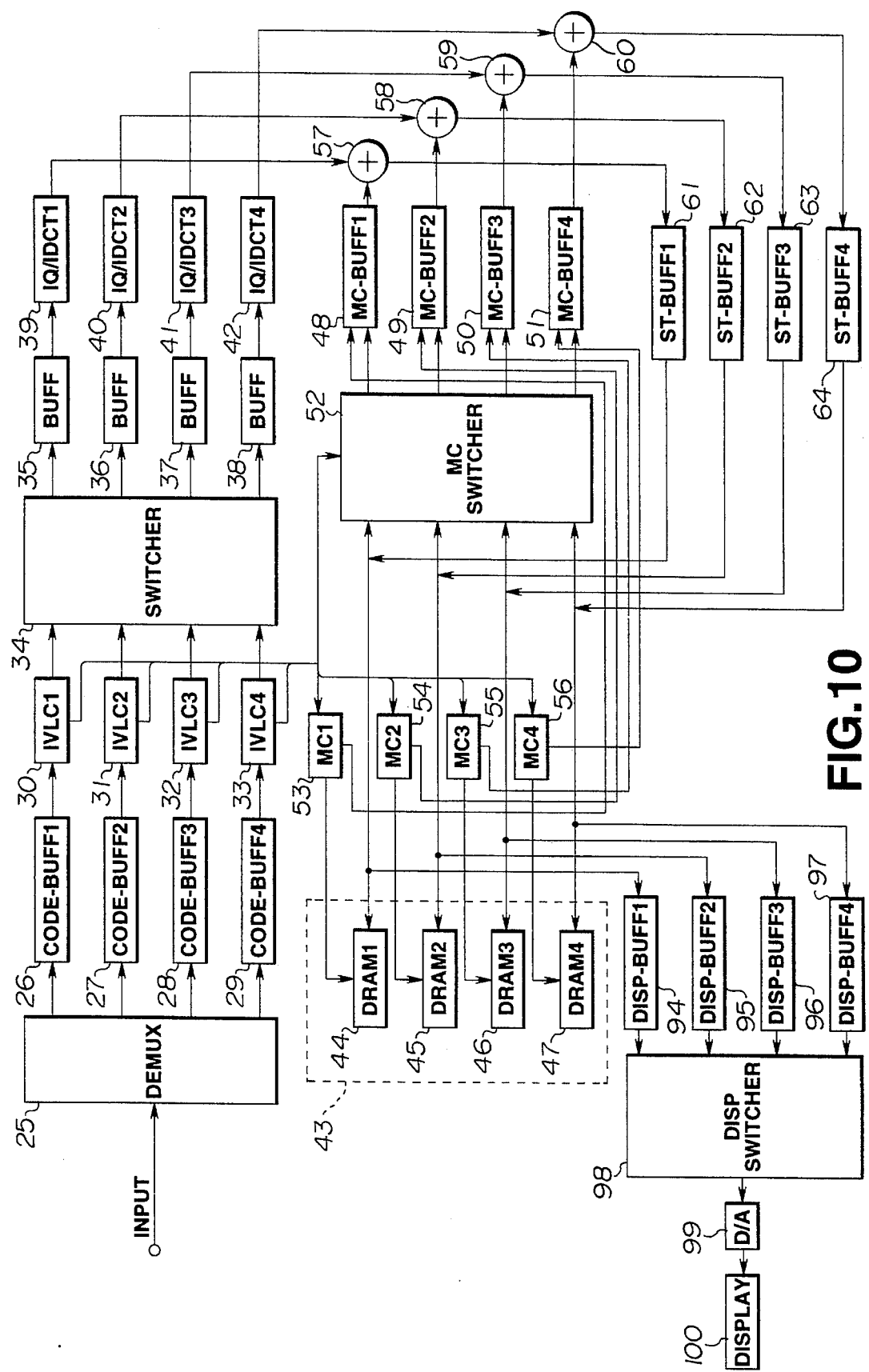
FIG. 10 is a block diagram of an alternative embodiment of an apparatus for decoding a moving picture video data signal in accordance with the present invention.

A method of operating the embodiment illustrated in FIG. 10 will be described with reference to FIGS. 11(A)–(C).

Figures 11A, 11B, 11C:
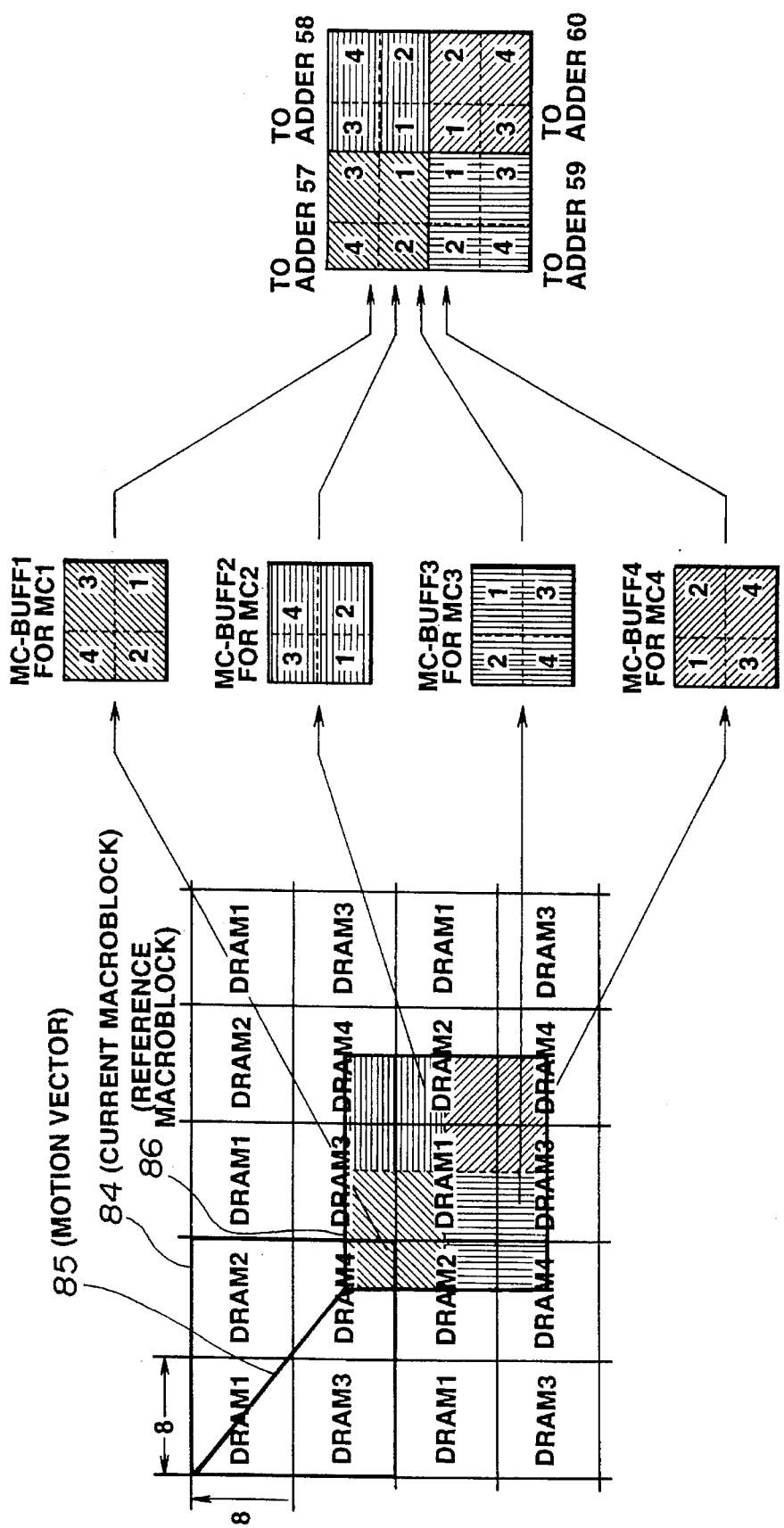
FIGS. 11(A), 11(B) and 11(C) together schematically illustrate a manner in which reference data is provided on the basis of a motion vector to adders that are part of the apparatus of FIG. 10.

FIG. 11(A) is similar to FIG. 8(A), and shows a square 84 which represents the geometric area corresponding to the macroblock currently being processed, motion vector 85 associated with the current macroblock, and a shaded square 86 which represents the appropriate reference data for the current macroblock as indicated by the motion vector 85. It will also be noted that the reference data is distributed for storage among the DRAMs 44–47 in a block-wise manner according to the same checkered pattern shown in FIG. 8(A).

Under control of the motion compensation processing blocks 53–56, and on the basis of the motion vector for the current macroblock, data is read out from the DRAMs 44–47 and routed to the motion compensation buffers 48–51 by the MC switcher 52 so that all of the reference data to be provided to the adder 57 is stored in the motion compensation buffer 48, all of the reference data to be provided to the adder 58 is stored in the motion compensation buffer 49, all of the reference data to be provided to the adder 59 is stored in the motion compensation buffer 50, and all of reference data to be provided to the adder 60 is stored in the motion compensation buffer 51. Referring to FIGS. 11(A) and (B), it will be noted that the data represented by the upper left quadrant of the shaded square 86 is stored in the motion compensation buffer 48, the data represented by the upper right quadrant of the shaded square 86 is stored in the motion compensation buffer 49, the data represented by the lower left quadrant of the shaded square 86 is stored in the motion compensation buffer 50, and the data represented by the lower right quadrant of the shaded square 86 is stored in the motion compensation buffer 51. More specifically, during an initial read out period, data is simultaneously read out from all four of the DRAMs 44–47 and routed such that data from a portion of the DRAM 47 is stored in motion compensation buffer 48, while data from a portion of DRAM 46 is stored in motion compensation buffer 49, data from a portion of DRAM 45 is stored in motion compensation buffer 50, and data from a portion of DRAM 44 is stored in motion compensation buffer 51. During a second read out period there is again simultaneous reading out of data from the four DRAMs, but now the routing is such that data from a portion of DRAM 46 is stored in motion compensation buffer 48, data from a portion of DRAM 47 is stored in motion compensation buffer 49, data from a portion of DRAM 44 is stored in motion compensation buffer 50, and data from a portion of DRAM 45 is stored in motion compensation buffer 51. Moreover, during a third read out period, again there is simultaneous read out from all of the DRAMs, but routing is performed so that data from a portion of DRAM 45 is stored in motion compensation buffer 48, data from a portion of DRAM 44 is stored in motion compensation buffer 49, data from a portion of DRAM 47 is stored in motion compensation buffer 50, and data from a portion of DRAM 46 is stored in motion compensation buffer 51. Then, during a final read out period, data is simultaneously read out from four DRAMs and routed such that data from a portion of DRAM 44 is stored in motion compensation buffer 48, data from a portion of DRAM 45 is stored in motion compensation buffer 49, data from a portion of DRAM 46 is stored in motion compensation buffer 50, and data from a portion of DRAM 47 is stored in motion compensation buffer 51.

It will be observed that data from every one of the four DRAMS is thus stored in each of the motion compensation buffers. Moreover, with reading of the data from the DRAMs and control of the MC switcher 52 on the basis of the motion vector for the current macroblock, memory access can be performed without overlap.

Also, because each of the motion compensation buffers are associated exclusively with a respective adder, and the reference data has been stored appropriately therein, as shown in FIG. 11(C), there is also no difficulty in accessing the motion compensation buffers.

There will now be described, with reference to FIGS. 12 and 13, in addition to FIG. 10, an alternative method of operating the embodiment of FIG. 10 so that the appropriate reference data is stored in each of the motion compensation buffers 48–51.

Figures 12A, 12B:
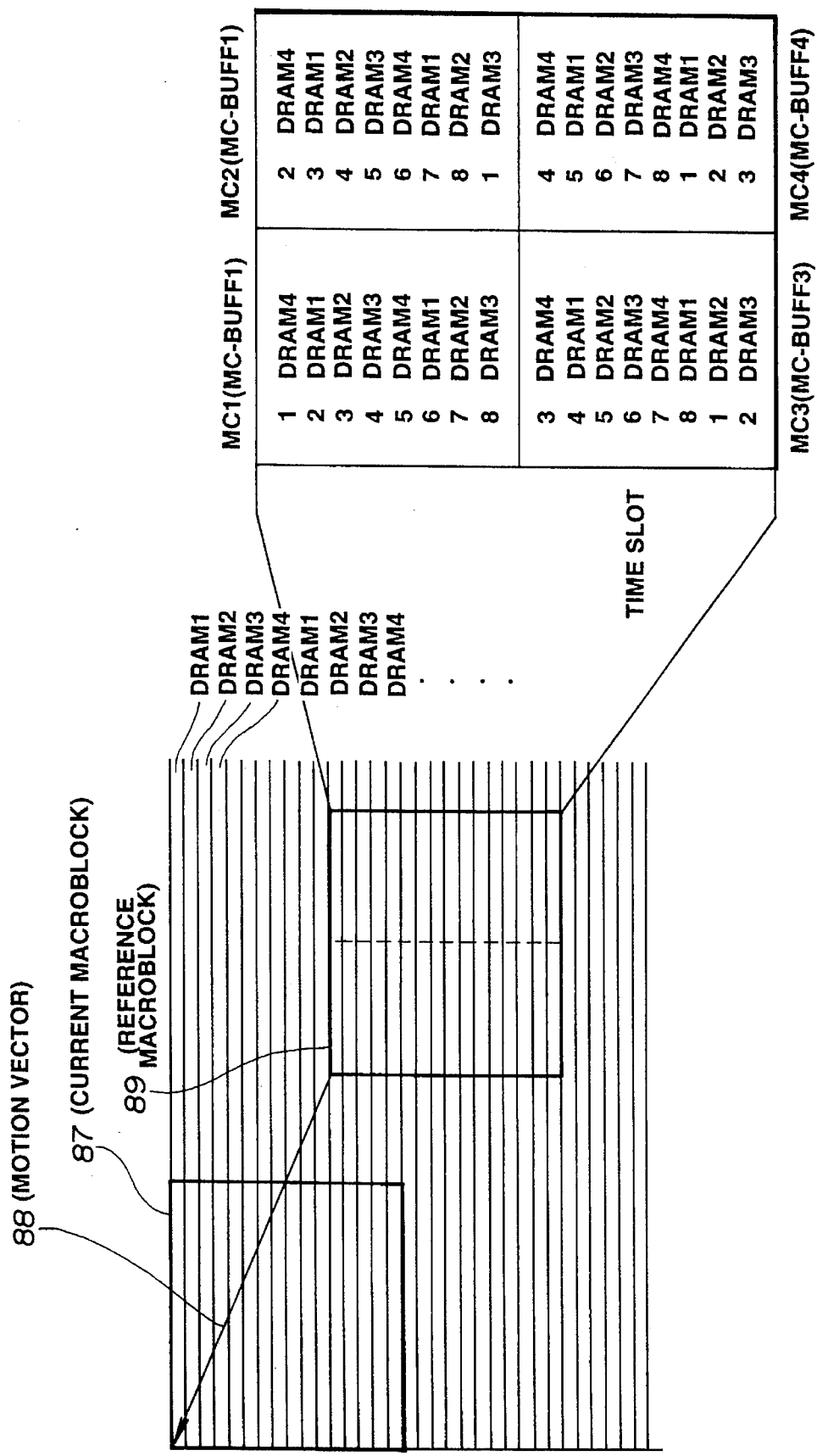
FIGS. 12(A) and 12(B) together schematically illustrate an alternative manner in which reference data is provided on the basis of a motion vector to the adders which are part of the apparatus of FIG. 10.

As indicated in FIG. 12(A), according to this alternative method of operation, the reference data is distributed line-by-line among the DRAMS 44–47, rather than block-by-block, as in the technique shown in FIG. 11(A). For example, referring again to FIG. 12(A), the data for the first line of each macroblock (i.e., the first line of the first and second blocks of the macroblock), is stored in DRAM 44, the second line of data of each macroblock is stored in DRAM 45, the third line of data for each macroblock is stored in DRAM 46, the fourth line of each macroblock is stored in DRAM 47, the fifth line of each macroblock is stored in DRAM 44, and so forth, continuing in a cyclical fashion, line-by-line. It should be understood that the data for the ninth line of each macroblock (i.e., the first line of data in the third and fourth blocks of each macroblock) is stored in DRAM 44, whereas the data for the last line of each macroblock (i.e., the last line of the last two blocks of the macroblock) is stored in DRAM 47. Accordingly, the reference data is distributed among the DRAM 44–47 according to a striped pattern, rather than the checkered pattern of FIG. 11(A).

In FIG. 12(A), the square labelled 87 represents the geometric area which corresponds to the macroblock which is currently to be decoded, the motion vector 88 is the motion vector associated with the current macroblock, and the square 89 represents the appropriate reference data for the current macroblock, as indicated by the motion vector 88.

Figure 13:
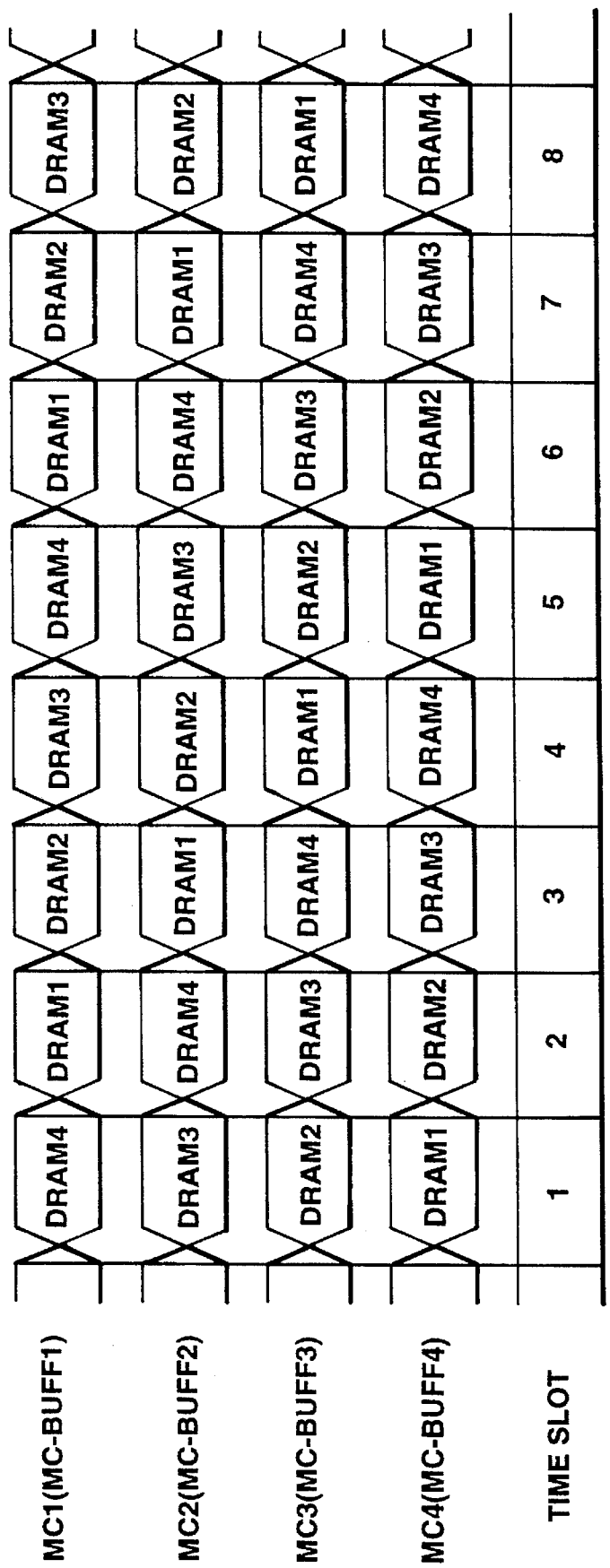
FIG. 13 is timing diagram which illustrates an operation for providing reference data according to the example shown in FIG. 12.
Figure 14:
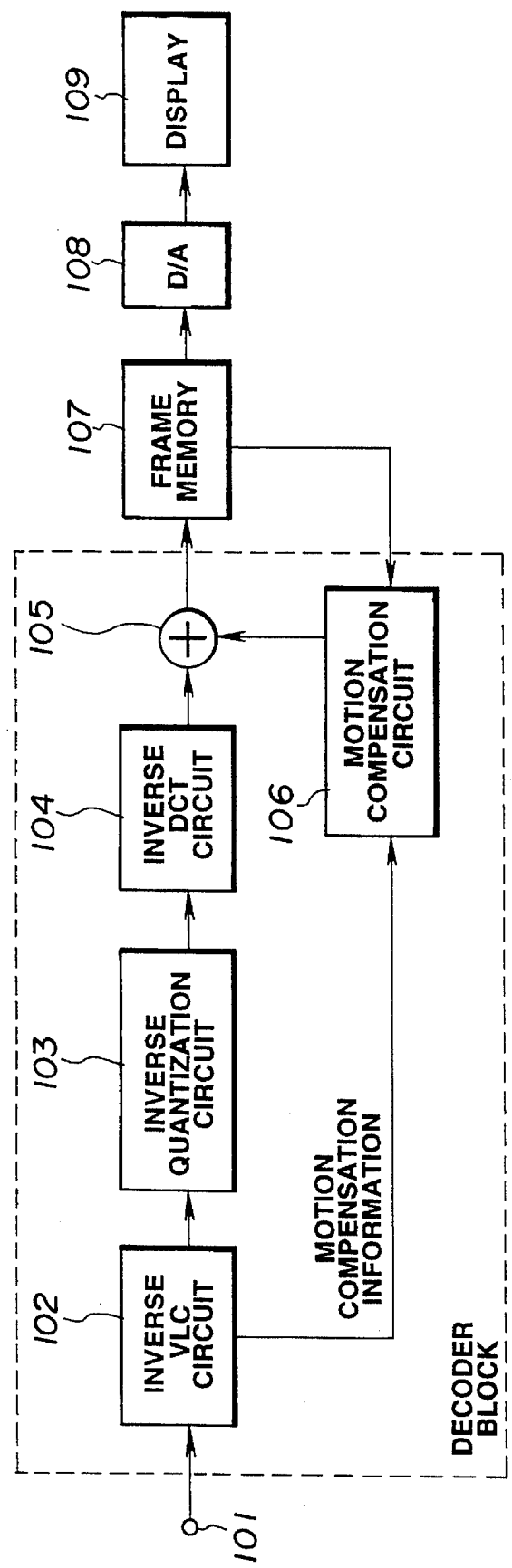
FIG. 14 is a block diagram of a conventional apparatus for decoding and reproducing a moving picture video data signal.
Figure 15:
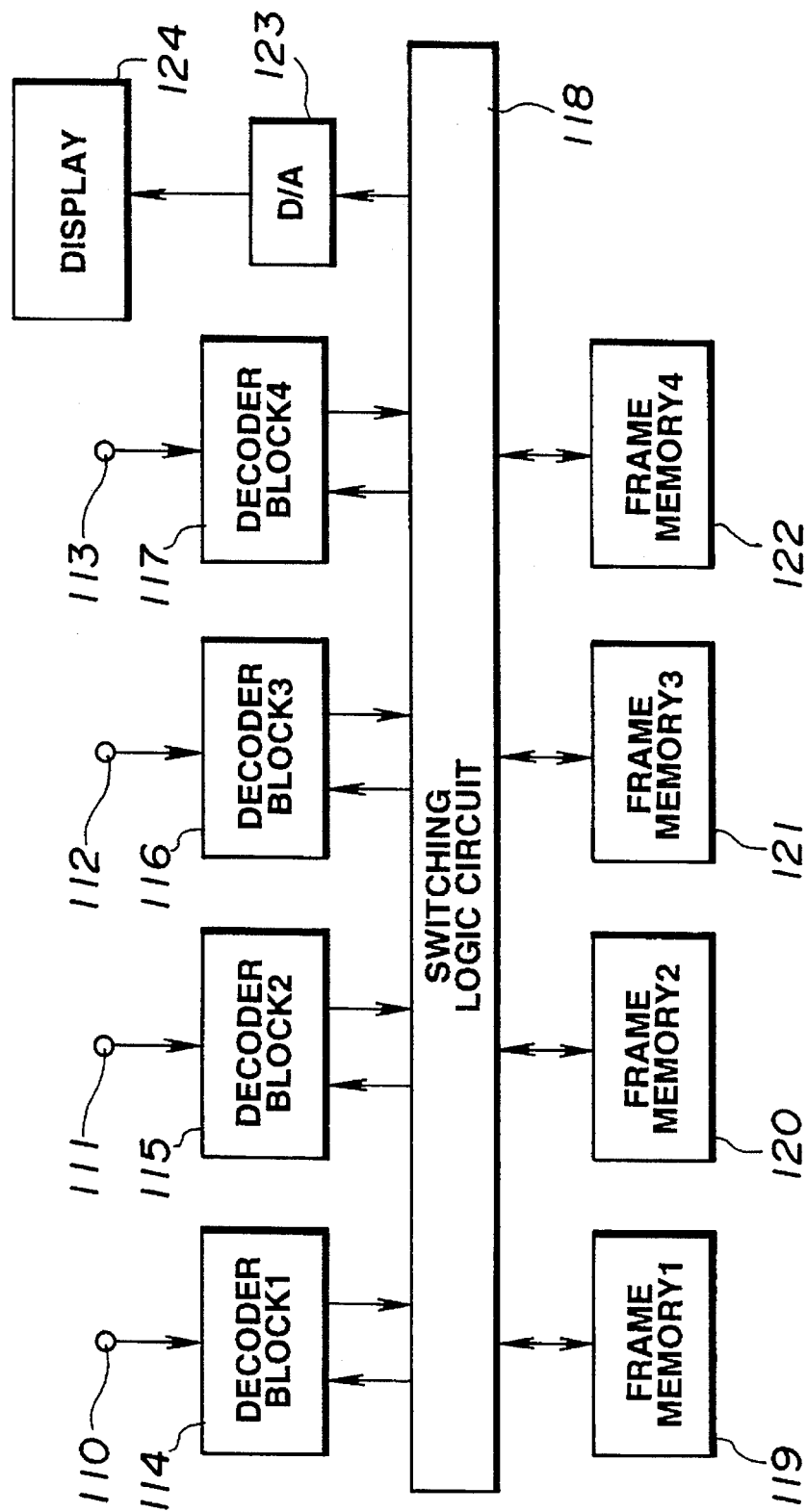
FIG. 15 is a block diagram of a portion of a conventional apparatus for decoding and reproducing a moving picture video data signal by means of parallel processing.
Figure 16:
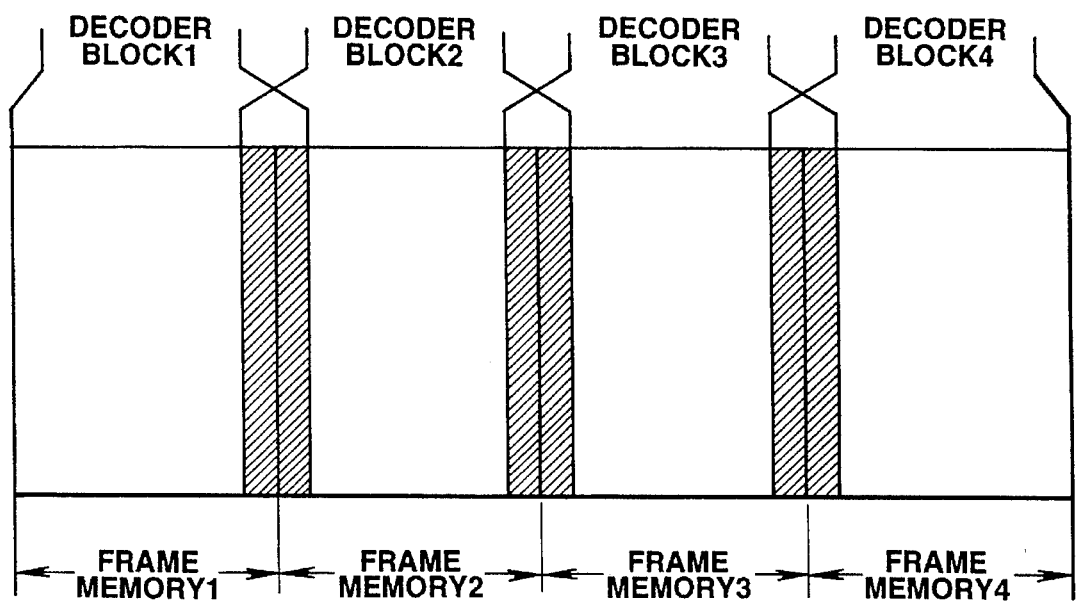
FIG. 16 schematically illustrates operation of the conventional decoding apparatus of FIG. 15.

FIGS. 12(B) and FIG. 13 indicate the sources of data and the timing according to which the appropriate reference data is stored in the motion compensation buffers 48–51. As before, data is read out from the DRAMS 44–47 and routed by MC switcher 52 under the control of the motion compensation processing blocks 43–56 and on the basis of the motion vector for the current macroblock.

In particular, during a first time slot, the reference data corresponding to the first line of the first block is read out from DRAM 47 and stored in motion compensation buffer 48. During the same time slot, reference data corresponding to the eighth line of the second block is read out from DRAM 46 and stored in motion compensation buffer 49, reference data for the seventh line of the third block is read out from DRAM 45 and stored in motion compensation buffer 50, and reference data for the sixth line of the fourth block is read out from DRAM 44 and stored in motion compensation buffer 51.

In the next (second) time slot, a one line shift in routing occurs, so that reference data for the second line of the first block is read out from DRAM 44 and stored in motion compensation buffer 48, reference data for the first line of the second block is read out from DRAM 47 and stored in motion compensation buffer 49, reference data for the eighth line of the third block is read out from DRAM 46 and stored in motion compensation buffer 50, and reference data for the seventh line of the fourth block is read out from DRAM 45 and stored in motion compensation buffer 51.

The one-line shifts are continued in each of the succeeding six time slots so that the data is read out, routed and stored in the motion compensation buffers according to the pattern shown in FIGS. 12(B) and 13. It will be observed that memory access occurs, as before, without overlapping.

As a result, the reference data which is to be supplied to adder 57 is stored in motion compensation buffer 48, reference data which is to be supplied to adder 58 is stored in motion compensation buffer 49, reference data which is to be supplied to adder 59 is stored in motion compensation buffer 50, and reference data which is to be supplied to adder 60 is stored in motion compensation buffer 51. Again, there is no problem with overlapping memory accesses with respect to the motion compensation buffers.

Although the above embodiments of the present invention have been described with respect to a decoding apparatus, it should be understood that the same could also be applied to a local decoder provided in a data encoding apparatus.

The moving picture video data decoding apparatus provided in accordance with this invention distributes an input data stream for parallel decoding processing on the basis of synchronizing code signals present in the data stream, and the decoding processing is continuously carried out within a time period between synchronizing codes. Accordingly, there is no limitation placed on the coding method with respect to time periods between synchronizing codes. Thus, parallel decoding processing can be carried out with respect to data that has been encoded by a conventional method which difference-codes motion vectors, DC coefficients and the like on the basis of differences between a current block and a previous block.

In addition, in the decoding apparatus provided in accordance with this invention, the blocks making up a macroblock are simultaneously processed in parallel so that video data that has been encoded by a conventional encoding method, without modification, can be reproduced at high speed.

Furthermore, decoding of motion-compensation coded video data can be carried out with parallel read-out of reference data from a plurality of memory banks based on the same motion vector, so that a plurality of reference data memory banks and motion compensation circuits can be operated in parallel to carry out high speed processing on the basis of a conventional encoding method that is not modified by limiting the range of motion vectors, or by placing other limitations on motion prediction.

As used in the specification and the following claims, the term "image frame" should be understood to mean a signal representing a picture upon which motion-compensated predictive coding is performed. As will be understood by those skilled in the art, such a picture may be formed, for example, of a progressive-scanned video frame, one field of an interlace-scanned video frame, or two fields which together make up an interlace-scanned video frame.

Having described specific preferred embodiments of the present invention with reference to the accompanying drawings, it is to be understood that the invention is not limited to those precise embodiments, and that various changes and modifications may be effected by one skilled in the art without departing from the scope or spirit of the invention as defined in the appended claims.

What is claimed is:

1. An apparatus for decoding an input digital video signal which includes groups of blocks of prediction-coded difference data, each of said groups consisting of a predetermined plurality of said blocks and having a respective motion vector associated therewith which is the same for all of said blocks in the respective one of said groups, each of said blocks of prediction-coded difference data having been formed as a function of the respective motion vector associated with the respective group which includes said block, the apparatus comprising:

a plurality of adding means for adding respective ones of said blocks of prediction-coded difference data contained in one of said groups of blocks and corresponding blocks of distributed reference data to form blocks of decoded data;

supply means for supplying, in parallel, said blocks of prediction—coded difference data contained in said one group thereof to the respective ones of said plurality of adding means; and reference data means for concurrently supplying said corresponding blocks of distributed reference data to said respective ones of said plurality of adding means, said reference data means including:

a plurality of reference data memories for respectively storing corresponding blocks of reference data from each of a plurality of groups of blocks of reference data so that all the blocks of reference data of each of said plural groups of blocks thereof are stored in respective ones of said plurality of reference data memories, each of said blocks of reference data being formed from previously determined decoded data, means for reading out portions of said blocks of reference data corresponding to a respective one of said groups of blocks of prediction-coded difference data, said portions being read out in parallel from said plurality of reference data memories as a function of said motion vector associated with said respective one group of blocks of prediction-coded difference data and which is the same for all of said blocks in said one group thereof, said portions being derived from at least one of said groups of reference data without overlap, a plurality of buffer memories, each corresponding to a respective one of said reference data memories, for temporarily storing respective ones of said portions of the blocks of reference data that are read out from a corresponding respective one of said plurality of reference data memories, means for reading out, in parallel, from said buffer memories, the temporarily stored portions of said blocks of reference data as a function of said motion vector associated with said respective one group of blocks of prediction-coded difference data and which is the same for all of said blocks in said respective one group thereof, and distributing means for distributing among said plurality of adding means, as a function of said motion vector associated with said respective one group of blocks of prediction-coded data and which is the same for all of said blocks in said respective one group thereof, said portions of the blocks of reference data being read out from said plurality of buffer memories into blocks of distributed reference data such that respective regions of a video image represented by said blocks of distributed reference data correspond to respective regions of a video image represented by said blocks of prediction-coded difference data without restricting the size of said motion vector associated with said respective one group of blocks of prediction-coded difference data.

2. An apparatus according to claim 1; wherein each of said groups of blocks of prediction-coded difference data is a macro-block which includes four blocks of prediction-coded data and said plurality of adding means consists of four adders operating in parallel.

3. An apparatus according to claim 1; wherein said input digital video signal includes input signal blocks that were formed by transform encoding and then variable-length encoding blocks of prediction-coded difference data, and said supply means comprises:

decoding means for variable-length decoding plural series of said input signal blocks such that corresponding variable-length decoded signal blocks of said plural series are outputted concurrently;

parallel data switching means for switching said concurrently outputted variable-length decoded signal blocks supplied by said decoding means into plural parallel data streams in which the variable-length decoded blocks of a respective one of said series are outputted concurrently; and a plurality of inverse transform means for each receiving a respective one of said parallel data streams and for performing inverse transform processing on the variable-length decoded signal blocks in the respective data stream to form blocks of prediction-coded difference data that are supplied to said adding means.

4. An apparatus according to claim 3; wherein said decoding means includes a plurality of decoders for variable-length decoding respective ones of said plural series of input signal blocks; and further comprising means for forming said series of input signal blocks from a bit stream representing an image frame as a function of synchronizing signals provided at predetermined bits in said bit stream.

5. An apparatus for decoding an input digital video signal which includes groups of prediction-coded difference data, each of said groups consisting of a predetermined plurality of said blocks and having a respective motion vector associated therewith which is the same for all of said blocks in the respective one of said groups, each of said blocks of prediction-coded difference data having been formed as a function of the respective motion vector associated with the respective group which includes said block, the apparatus comprising:

a plurality of adding means for adding respective ones of said blocks of prediction-coded difference data contained in each of said groups of blocks and corresponding blocks of distributed reference data to form blocks of decoded data;

supply means for supplying, in parallel, said blocks of prediction-coded difference data contained in said one group thereof to the respective ones of said plurality of adding means; and reference data means for concurrently supplying said corresponding blocks of distributed reference data to said plural adding means, said reference data means comprising:

a plurality of reference data memories for respectively storing corresponding blocks of reference data from each of a plurality of groups of blocks of reference data so that all the blocks of reference data of each of said plural group of blocks thereof are stored in respective ones of said plurality of reference data memories, each of said blocks of reference data being formed from a corresponding block of previously determined decoded data, means for reading out portions of said blocks of reference data corresponding to a respective one of said groups of blocks of prediction-coded difference data, said portions being read out in parallel from said plurality of reference data memories as a function of said motion vector associated with said respective one group of blocks of prediction-coded difference data and which is the same for all of said blocks in said one group thereof, said portions being derived from at least one of said groups of reference data without overlap, distributing means for distributing as a function of said motion vector associated with said respective one group of blocks of prediction-coded data and which is the same for all of said blocks in said respective one group thereof, said portions of the blocks of reference data being read out from the plurality of reference data memories into blocks of distributed reference data such that respective regions of a video image represented by said blocks of distributed reference data correspond to respective regions of a video image represented by said blocks of prediction-coded difference data without restricting the size of said motion vector associated with said respective one group of blocks of prediction-coded difference data, and a plurality of buffer memories, each corresponding to a respective one of said plurality of adding means, for temporarily storing a respective block of said distributed reference data and for supplying the temporarily stored block of distributed reference data to said respective one of said plurality of adding means.

6. An apparatus according to claim 5; wherein each of said groups of blocks is a macroblock which includes four blocks of prediction-coded data and said plurality of adding means consists of four adders operating in parallel.

7. An apparatus according to claim 5; wherein said input digital video signal includes input signal blocks that were formed by transform encoding and then variable-length encoding blocks of prediction-coded difference data, and said supply means comprises:

decoding means for variable-length decoding plural series of said input signal blocks such that corresponding variable-length decoded signal blocks of said plural series are outputted concurrently;

parallel data switching means for switching said concurrently outputted variable-length decoded signal blocks supplied by said decoding means into plural parallel data streams in which the variable-length decoded blocks of a respective one of said series are outputted concurrently; and a plurality of inverse transform means for each receiving a respective one of said parallel data streams and for performing inverse transform processing on the variable-length decoded signal blocks in the respective data stream to form blocks of prediction-coded difference data that are supplied to said adding means.

8. An apparatus according to claim 7; wherein said decoding means is one of a plurality of decoding means, each for variable-length decoding a respective one of said plural series of input signal blocks; and further comprising distributing means for forming said respective series of input signal blocks from a bit stream representing an image frame as a function of synchronizing signals provided at predetermined bits in said bit stream.

9. Apparatus according to claim 5, wherein said plurality of buffer memories comprises first, second, third and fourth buffer memories, said groups of blocks of reference data and said groups of blocks of prediction-coded difference data are respective macroblocks each comprised of four blocks which respectively represent upper left, upper right, lower left and lower right quadrants of the respective macroblock, and said distributing means comprises:

means for storing, in the first buffer memory, a first block of distributed reference data formed of the portions of the blocks of reference data corresponding to the upper left quadrants of the macroblocks of prediction-coded difference data;

means for storing, in the second buffer memory, a second block of distributed reference data formed of the portions of the blocks of reference data corresponding to the upper right quadrants of the macroblocks of prediction-coded difference data;

means for storing, in the third buffer memory, a third block of distributed reference data formed of the portions of the blocks of reference data corresponding to the lower left quadrants of the macroblocks of prediction-coded difference data; and means for storing, in the fourth buffer memory, a fourth block of distributed reference data formed of the portions of the blocks of reference data corresponding to the lower right quadrants of the macroblocks of prediction-coded difference data.

10. A method of decoding an input digital video signal which includes groups of blocks of prediction-coded difference data, each of said groups consisting of a predetermined plurality of said blocks and having a respective motion vector associated therewith which is the same for all of said blocks included in the respective one of said groups, each of said blocks of prediction-coded difference data having been formed as a function of the motion vector associated with the respective group which includes said block, the method comprising the steps of:

concurrently supplying the blocks of prediction-coded difference data contained in each respective one of said groups of blocks;

separately storing blocks of reference data from each of a plurality of groups of blocks of reference data so that all the blocks of reference data of said plurality of groups of blocks thereof are stored, each of said blocks of reference data being formed from previously determined decoded data;

reading out portions of said blocks of reference data corresponding to respective ones of said blocks of prediction-coded difference data, said portions being read out in parallel as a function of the motion vector associated with said respective one group of prediction-coded difference data and which is the same for all of said blocks in said one group thereof, said portions being derived from at least one of said groups of reference data without overlap;

temporarily storing the read out portions of said blocks of reference data;

reading out, in parallel, the temporarily stored portions of said blocks of reference data as a function of said motion vector associated with said respective one group of blocks of prediction-coded difference data and which is the same for al of said blocks in said respective one group thereof;

distributing, as a function of said motion vector associated with said respective one group of blocks of prediction-coded difference data and which is the same for all of said blocks in said respective one group thereof, said portions of the blocks of the temporarily stored reference data into blocks of distributed reference data such that respective regions of a video image represented by said blocks of distributed reference data correspond to respective regions of a video image represented by said blocks of prediction-coded difference coded without restricting the size of said motion vector associated with said respective one group of prediction-coded difference data; and adding, in parallel, the blocks of prediction-coded difference data contained in each said group thereof and the corresponding blocks of distributed reference data.

11. A method according to claim 10, wherein said input digital video signal includes input signal blocks that were formed by transform-encoding and then variable-length encoding blocks of prediction-coded difference data; and wherein said step of concurrently supplying comprises the sub-steps of:

variable-length decoding plural series of said input signal blocks such that corresponding variable-length decoded signal blocks of said plural series are outputted concurrently;

switching said concurrently outputted variable-length decoded signal blocks into plural parallel data streams in which the variable-length decoded blocks of a respective one of said series are outputted concurrently; and parallely performing inverse transform processing on the variable-length decoded signal blocks in the respective data stream to form blocks of prediction-coded difference data.

12. A method according to claim 11; further comprising the steps of:

forming in parallel plural series of input signal blocks from a bit stream representing an image frame of input video signals as a function of synchronizing signals provided at predetermined bits in said bit stream; and variable-length decoding, in parallel, the plural series of input signal blocks.

13. A method of decoding an input digital video signal which includes groups of blocks of prediction-coded difference data, each of said groups consisting of a predetermined plurality of said blocks and having a respective motion vector associated therewith which is the same for all of said blocks included in the respective one of said groups, each of said blocks of prediction-coded difference data having been formed as a function of the motion vector associated with the respective group which includes said block, the method comprising the steps of:

concurrently supplying the blocks of prediction-coded difference data contained in each respective one of said groups of blocks;

separately storing blocks of reference data from each of a plurality of groups of blocks of reference data so that all the blocks of reference data of said plurality of groups of blocks thereof are stored, each of said blocks of reference data being formed from previously determined decoded data;

reading out portions of said blocks of reference data corresponding to respective ones of said blocks of prediction-coded difference data, said portions being read out in parallel as a function of the motion vector associated with said respective one group of prediction-coded difference data and which is the same for all of said blocks in said one group thereof, said portions being derived from at least one of said groups of reference data without overlap;

distributing, as a function of said motion vector associated with said respective one group of blocks of prediction-coded difference data and which is the same for all of said blocks in said respective one group thereof, said portions of the blocks of the temporarily stored reference data into blocks of distributed reference data such that respective regions of a video image represented by said blocks of distributed reference data correspond to respective regions of a video image represented by said blocks of prediction-coded difference data without restricting the size of said motion vector associated with said respective one group of prediction-coded difference data;

temporarily storing the blocks of distributed reference data;

reading out the temporarily stored blocks of distributed reference data; and adding, in parallel, the blocks of prediction-coded difference data contained in each said group thereof and the corresponding blocks of distributed referenced data.

14. A method according to claim 13; wherein said input digital video signal includes input signal blocks that were formed by transform-encoding and then variable-length encoding blocks of prediction-coded difference data, said supplying step comprising the sub-steps of:

variable-length decoding plural series of said input signal blocks such that corresponding variable-length decoded signal blocks of said plural series are outputted concurrently;

switching said concurrently outputted variable-length decoded signal blocks into plural parallel data streams in which the variable-length decoded blocks of a respective one of said series are outputted concurrently; and performing, in parallel, inverse transform processing on the variable-length decoded signal blocks in the respective data stream to form blocks of prediction-coded difference data.

15. A method according to claim 14; further comprising the steps of:

forming in parallel plural series of input signal blocks from a bit stream representing an image frame of input video signals as a function of synchronizing signals provided at predetermined bits in said bit stream; and variable-length decoding, in parallel, the plural series of input signal blocks.

16. An apparatus for decoding an input digital video signal which includes groups of blocks of prediction-coded difference data, each of said groups consisting of a predetermined plurality of said blocks and having a respective motion vector associated therewith which is the same for all of said blocks in the respective one of said groups, each of said blocks of prediction-coded difference data having been formed as a function of the respective motion vector associated with the respective group which includes said block, the apparatus comprising:

a plurality of adding means, each associated with a respective one of said blocks of prediction-coded difference data contained in one of said groups of blocks so that each of said blocks contained in said one group is associated with a respective one of said plurality of adding means, for adding, in parallel, said blocks contained in said group and corresponding blocks of distributed reference data to form respective blocks of decoded data;

supply means for supplying, to said plurality of adding means, in parallel, said blocks of prediction-coded difference data contained in each said group thereof; and reference data means for concurrently supplying said corresponding blocks of distributed reference data to said plurality of adding means, said reference data means comprising:

a plurality of reference data memories, each for storing corresponding lines of reference data from each of a plurality of groups of lines of reference data such that all the lines of reference data of said plurality of lines are stored among said plurality of reference data memories, each of said lines of reference data being formed from previously determined decoded data, means for reading out portions of said lines of reference data corresponding to a respective one of said groups of blocks of prediction-coded difference data, said portions being read out in parallel from the respective ones of said plurality of reference data memories as a function of said motion vector associated with said respective one group of blocks of prediction-coded difference data and which is the same for all of said blocks in said respective one group thereof, said portions being derived from at least one of said groups of lines of reference data without overlap, distributing means for distributing, as a function of said motion vector associated with said respective one group of blocks of prediction-coded difference data, said portions of the lines of reference data read out from the plurality of reference data memories into blocks of distributed reference data such that respective regions of a video image represented by said blocks of distributed reference data correspond to respective regions of a video image represented by said blocks of prediction-coded difference data without restricting the size of said motion vector associated with each said group of blocks of prediction-coded difference data, and a plurality of buffer memories, each corresponding to a respective one of said plurality of adding means, for temporarily storing a respective block of said distributed reference data and for supplying the temporarily stored block of distributed reference data to a respective one of said plurality of adding means.

17. Apparatus according to claim 16; wherein each of said groups of lines of reference data is a macro-block comprised of a number of lines that is an integral multiple of a number of reference data memories that forms said plurality of reference data memories, and said lines of each macro-block are distributed in cyclical fashion among said reference data memories.

18. Apparatus according to claim 17; wherein each of said macroblocks is composed of sixteen lines, and said number of memories is four.

19. An apparatus according to claim 16; wherein each of said groups of blocks of prediction-coded data is a macroblock which includes four blocks of prediction-coded data and said plurality of adding means consists of four adders operating in parallel.

20. An apparatus according to claim 16; wherein said input digital video signal includes input signal blocks that were formed by transform encoding and then variable-length encoding blocks of prediction-coded difference data, and said supply means comprises:

decoding means for variable-length decoding plural series of said input signal blocks such that corresponding variable-length decoded signal blocks of said plural series are outputted concurrently;

parallel data switching means for switching said concurrently outputted variable-length decoded signal blocks supplied by said decoding means into plural parallel data streams in which the variable-length decoded blocks of a respective one of said series are outputted concurrently; and a plurality of inverse transform means each for receiving a respective one of said parallel data streams and for performing inverse transform processing on the variable-length decoded signal blocks in the respective data stream to form blocks of prediction-coded difference data that are supplied to said adding means.

21. An apparatus according to claim 20; wherein said decoding means is one of a plurality of decoding means, each for variable-length decoding a respective one of said plural series of input signal blocks; and further comprising distributing means for forming said respective series of input signal blocks from a bit stream representing an image frame as a function of synchronizing signals provided at predetermined bits in said bit stream.

22. Apparatus according to claim 16, wherein said plurality of buffer memories comprises first, second, third and fourth buffer memories, said groups of blocks of prediction-coded difference data are macroblocks each comprised of four blocks which respectively represent upper left, upper right, lower left and lower right quadrants of the respective macroblock, and said distributing means comprises:

means for storing, in the first buffer memory, a first block of distributed reference data formed of the portions of the lines of reference data corresponding to the upper left quadrants of the macroblocks of prediction-coded difference data;

means for storing, in the second buffer memory, a second block of distributed reference data formed of the portions of the lines of reference data corresponding to the upper right quadrants of the macroblocks of prediction-coded difference data;

means for storing, in the third buffer memory, a third block of distributed reference data formed of the portions of the lines of reference data corresponding to the lower left quadrants of the macroblocks of prediction-coded difference data; and means for storing, in the fourth buffer memory, a fourth block of distributed reference data formed of the portions of the lines of reference data corresponding to the lower right quadrants of the macroblocks of prediction-coded difference data.

23. A method of decoding an input digital video signal which includes groups of blocks of prediction-coded difference data, each of said groups consisting of a predetermined plurality of said blocks and having a respective motion vector associated therewith which is the same for all of said blocks included in the respective one of said groups, each of said blocks of prediction-coded difference data having been formed as a function of the respective motion vector associated with the respective group which includes said block, the method comprising the steps of:

concurrently supplying the blocks of prediction-coded difference data contained in one of said groups of blocks;

separately storing lines of reference data from each of a plurality of groups of lines of reference data so that all the lines of reference data from said plurality of groups of lines are stored, each of said lines of reference data being formed from previously determined decoded data;

reading out portions of said lines of reference data corresponding to a respective one of said groups of blocks of prediction-coded difference data, said portions being read out in parallel as a function of the motion vector associated with said respective one group of blocks of prediction-coded difference data and which is the same for all of said blocks included in said respective one group thereof, said portions being derived from at least one of said groups of lines of reference data without overlap;

distributing, as a function of the motion vector associated with said respective one group of blocks of prediction-coded difference data, said portions of the lines of the read out reference data into blocks of distributed reference data such that respective regions of a video image represented by said blocks of distributed reference data correspond to respective regions of a video image represented by said blocks of prediction-coded difference data without restricting the size of said motion vector associated with said group of blocks of prediction-coded difference data;

temporarily storing the blocks of distributed reference data;

reading out the temporarily stored blocks of distributed reference data; and adding, in parallel, each of the blocks of prediction-coded difference data contained in said respective one group thereof and the corresponding blocks of distributed reference data.

24. A method according to claim 23; wherein said input digital video signal includes input signal blocks that were formed by transform-encoding and then variable-length encoding blocks of prediction-coded difference data, said supplying step comprising the sub-steps of:

variable-length decoding plural series of said input signal blocks such that corresponding variable-length decoded signal blocks of said plural series are outputted concurrently;

switching said concurrently outputted variable-length decoded signal blocks into plural parallel data streams in which the variable-length decoded blocks of a respective one of said series are outputted concurrently; and performing, in parallel, inverse transform processing on the variable-length decoded signal blocks in the respective data streams to form said blocks of prediction-coded difference data.

25. A method according to claim 24; further comprising the steps of:

forming in parallel plural series of input signal blocks from a bit stream representing an image frame of input video signals as a function of synchronizing signals provided at predetermined bits in said bit stream; and variable-length decoding, in parallel, the plural series of input signal blocks.

* * * * *